Nov. 22, 1966  W. E. BRAINARD ETAL  3,286,344
MACHINE TOOL WITH A TOOL CHANGER
Filed March 1, 1965  8 Sheets-Sheet 1

INVENTORS
WALLACE E. BRAINARD
& ERICH F. DRECHSLER
BY Cyril M. Hajewski
ATTORNEY INVENTORS
WALLACE E. BRAINARD
& ERICH F. DRECHSLER
BY Cyril M. Hajewski
ATTORNEY Nov. 22, 1966         W. E. BRAINARD ETAL         3,286,344
                  MACHINE TOOL WITH A TOOL CHANGER
Filed March 1, 1965                              8 Sheets-Sheet 5

INVENTORS
WALLACE E. BRAINARD
& ERICH F. DRECHSLER
BY Cyril M. Hajewski
ATTORNEY Nov. 22, 1966    W. E. BRAINARD ETAL    3,286,344
MACHINE TOOL WITH A TOOL CHANGER
Filed March 1, 1965    8 Sheets-Sheet 6
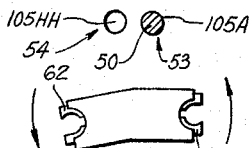
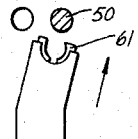
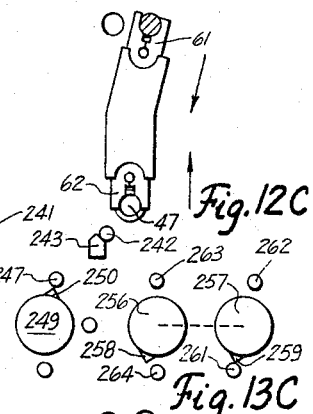
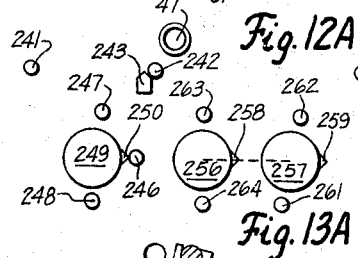
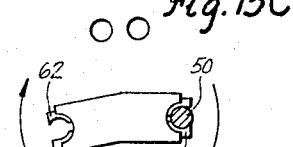
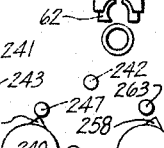
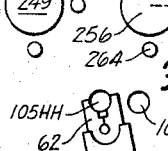
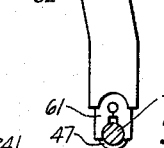
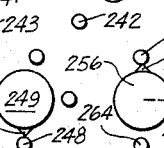
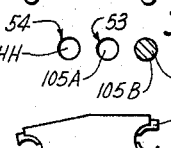
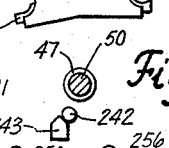
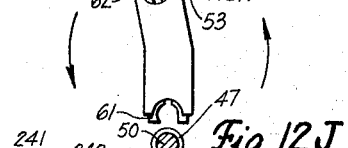
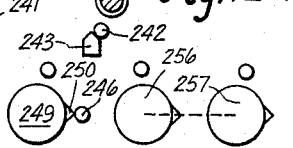
INVENTORS
WALLACE E. BRAINARD
& ERICH F. DRECHSLER
BY Cyril M. Hajewski
ATTORNEY INVENTORS
WALLACE E. BRAINARD
& ERICH F. DRECHSLER
BY Cyril M. Hajewski
ATTORNEY INVENTORS
WALLACE E. BRAINARD
& ERICH F. DRECHSLER
BY Cyril M. Hajewski
ATTORNEY

United States Patent Office 3,286,344
Patented Nov. 22, 1966

3,286,344
MACHINE TOOL WITH A TOOL CHANGER
Wallace E. Brainard and Erich F. Drechsler, Milwaukee, Wis., assignors to Kearney & Trecker Corporation, West Allis, Wis., a corporation of Wisconsin
Filed Mar. 1, 1965, Ser. No. 435,978
20 Claims. (Cl. 29—568)

The invention relates generally to a tool change mechanism for a machine tool and more particularly to an improved tool changer having a versatile tool storage and tool selecting means especially adapted to store and select a large range of tool sizes in a minimum amount of space.

It is a general object of the invention to provide an improved tool change mechanism and tool storage magazine for a machine tool.

Another object of this invention is to provide an improved tool change mechanism and having a tool storage magazine that may be operated to locate a storage position in the magazine having a desired tool at a ready station and locate an empty storage position in the magazine at a restock station in position to receive a previously used tool.

Another object is to provide an improved tool change mechanism and tool storage magazine in which tools may be stored in the order of their use and previously used tools returned to the storage position from which they were extracted while the succeeding tool is being transferred to the spindle.

Yet another object of the present invention is to provide an improved indexable tool storage magazine which will store normal size tools and large diameter tools in the sequence of their use and the indexing movement will automatically compensate for the increased space occupied by the large diameter tools.

Another object of the present invention is to provide an improved tool change mechanism having an indexable tool storage magazine in which a group of tools to be used in a work operation may be stored in the order of use but the tools need not occupy adjacent storage positions in the magazine, and the indexing movement of the magazine will automatically compensate for the vacant storage position to pass them through a "ready" station but will stop when the succeeding tool to be used is located in the "ready" station.

Another object of the present invention is to provide an improved control system for a tool storage magazine which incorporates a storage position counter and a tool counter in conjunction with a memory circuit so that tools may be sequentially located at a "ready" station even though they are not stored in adjacent storage positions and a storage position from which a preceding tool has been transferred to a work station may be located at a restock station to receive the tool that had originally been stored therein.

Another object of this invention is to provide a tool change mechanism which is disposed between a tool storage magazine and an operating spindle of a machine tool and which is operable to effect a simultaneous interchange of tools between the storage magazine and the operating spindle in which the tools are moved bodily in an arcuate path of less than 180°.

According to this invention, there is provided an improved tool change mechanism for a machine tool having a column and a rotatably mounted spindle with an indexable tool storage magazine. The tool storage magazine is indexably mounted on the upper portion of the machine column while the tool change mechanism is carried for bodily movement in spaced relationship with respect to the spindle and the storage magazine. The tool change mechanism is operable to effect an interchange of tools between the storage magazine and the spindle and to return the previously used tool to the same storage position in the magazine from whence it was originally withdrawn.

The tools stored in the magazine are arranged in the sequence of their use in the spindle. The magazine is provided with one station located at the right of a vertical plane passing through the axis of the spindle and referred to as the tool ready station, with another station being located to the left of the vertical plane which passes through the axis of the spindle and referred to as the tool restock station. With this arrangement, a unique tool change arm configuration makes it possible for the arm to effect a simultaneous interchange of tools between the magazine and spindle while removing the succeeding tool from the ready station in the magazine and returning the preceding tool from the spindle into the restock station. Since the tools are stored in the magazine in the sequential order of use, the magazine may be indexed during a work operation to locate the next succeeding tool in the ready station. This operation will automatically position the socket from whence the tool being used was withdrawn in position at the tool restock station for receiving the tool at the next tool change operation.

However, in some operations, tools of larger diameter are needed and these tools when stored in the magazine overlap the two adjacent sockets so that tools cannot be stored in these sockets. With this condition existing it is obvious that while the large tool can be located in position at the ready station, the empty socket at the tool restock station is not the socket from whence the tool in the spindle was withdrawn. Therefore, provisions have been made to count storage sockets as well as tools, and to store these counts in a memory circuit which is connected to continue the indexing of the magazine so that the latter will respond to position the correct socket at the restock station in position to receive its associated tool that is removed from the spindle. After the large tool has been placed in the spindle and the previously used tool has been replaced in its original storage socket, the magazine is again indexed to position the next succeeding tool in the ready station.

In a typical operating cycle, the tools are placed in the storage sockets in sequence. If one of such tools is a large diameter tool, a socket is left unoccupied on either side of the storage socket in which the large diameter tool is stored. This arrangement will provide the necessary room to accommodate the large diameter tool without interfering with the withdrawal or insertion of tools disposed on each side of the large diameter tool. The first tool in the sequence is indicated either manually or by a signal from a record to facilitate the sequential orderly progression of a group of tools for use in a particular work operation.

The magazine is actuated in an indexing movement for locating the next tool to be placed in the spindle at the tool ready station. The succeeding socket of the magazine is then disposed in the restock station. The tool change arm functions to remove the new tool from the ready station while simultaneously removing the old tool from the spindle. The tool change arm is rotated to relocate the tools in its grips and is then moved axially to insert the new tool into the spindle and the old tool into the socket at the restock station. It is imperative that the old tool be returned to the magazine socket from which it was removed for transfer to the spindle. If the tools are small enough to be disposed in adjacent sockets of the magazine the proper socket will be located in the restock station. However, if the tool is of a large diameter requiring that the adjacent sockets in the magazine remain empty to provide clearance, the socket from which the old tool was removed will be advanced one increment beyond the restock station. Under these circumstances, after the tool change arm has extracted the two tools from the ready station and the spindle, but before it inserts the two tools into their next locations, the magazine automatically indexes in a reverse direction to return the proper socket in the restock station. The tool change arm then completes its tool interchange operation by inserting the new tool into the spindle and the previously used tool into the magazine socket at the restock station. Since the magazine was indexed one increment in the reverse direction, the socket from which the old tool was removed is now located in the restock station so that the old tool is returned to the same socket from which it was previously extracted.

It will be apparent that with the present invention, uncoded tools may be utilized with a tool change mechanism and a tool storage magazine and such tools may be of any size within the limitations of the machine. It is also apparent the tools may be stored in each storage position of the magazine, or there may be empty storage positions. In either case, the selection and changing of tools will be accomplished without the need of an operator giving special attention to a tool changing cycle of operation.

The foregoing and other objects of this invention, which will become more fully apparent from the following detailed description, may be achieved by the exemplifying apparatus depicted and set forth in the specification in connection with the accompanying drawings, in which:

FIG. 7 is a view in vertical section taken along the plane represented by the line 7—7 in FIG. 2;

FIG. 8 is a view in vertical section taken along the plane represented by the line 8—8 in FIG. 2, the cams being shown separated for clarity;

Figure 15A:
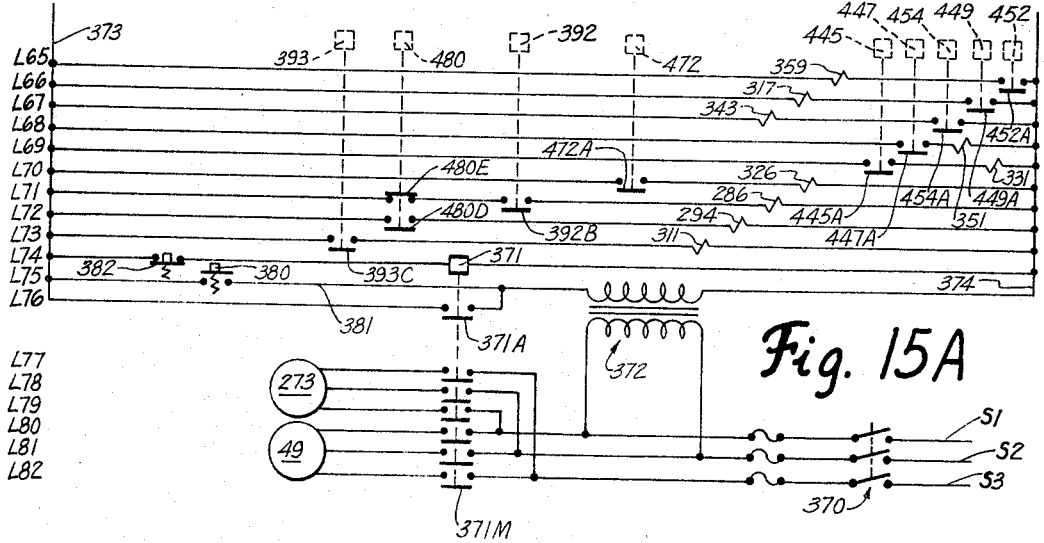
Figure 14:
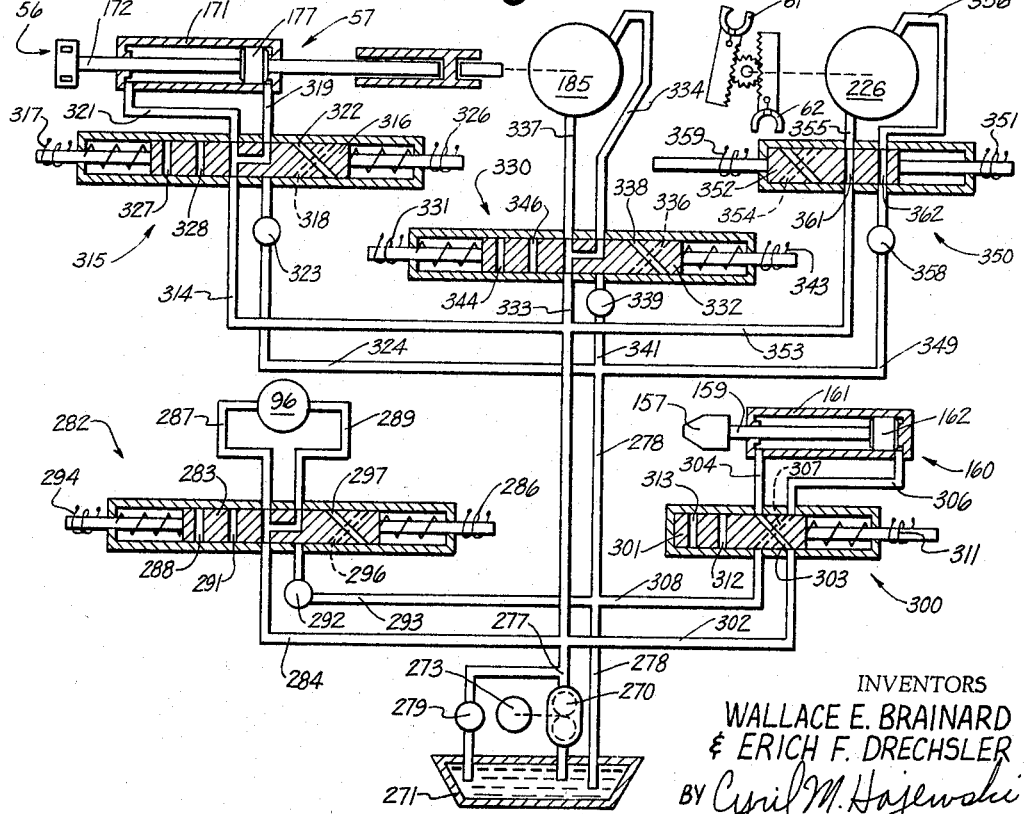
Figure 15:
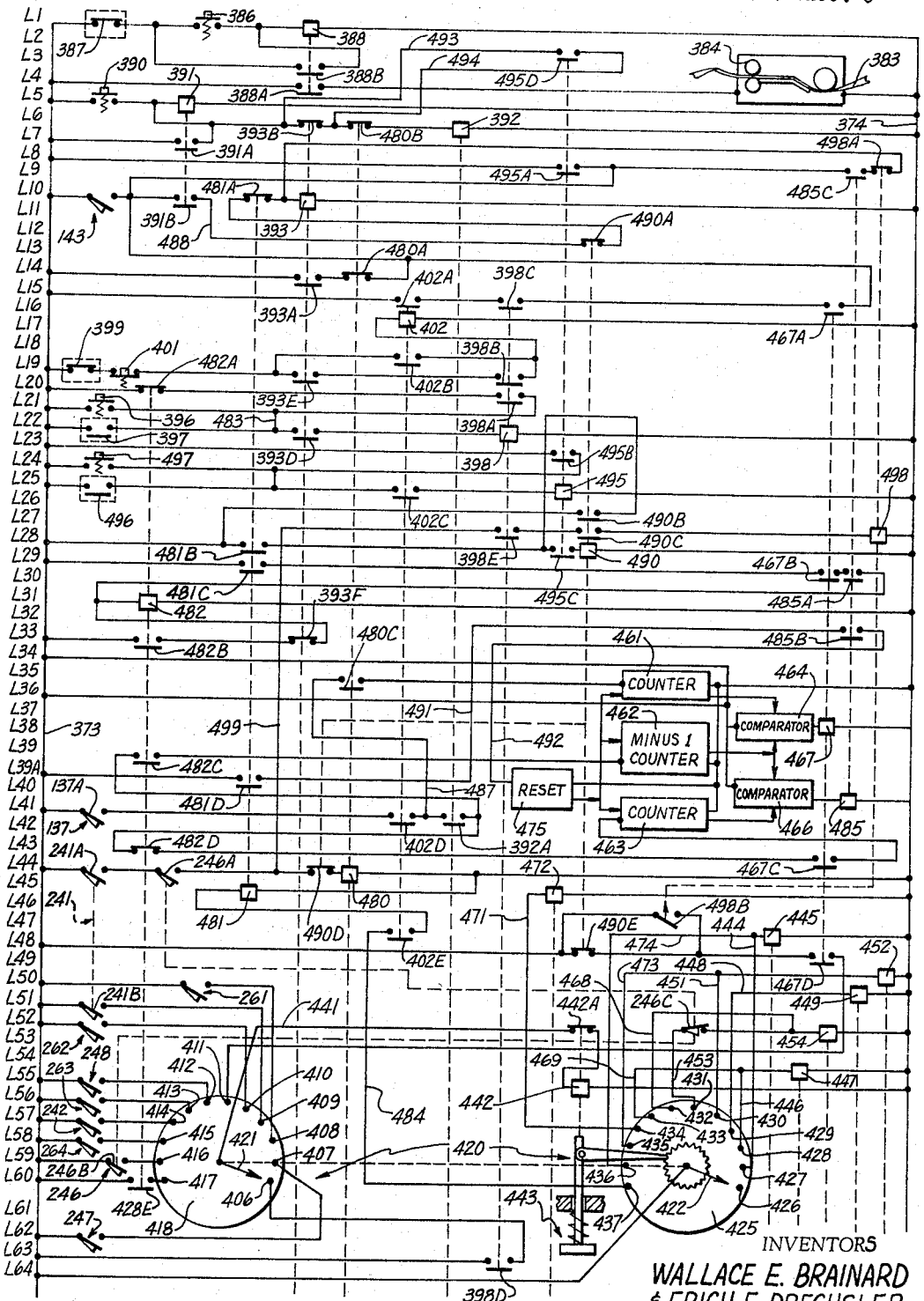

FIGS. 12A to 12L, inclusive, are a series of diagrammatic views showing the several rotary positions of the tool change arm in its extended and retracted positions, as well as the positions of the associated tool grips in the various rotary positions of the arm;

FIGS. 13A to 13K, inclusive, are a series of diagrammatic views of the several switch actuating cams in relation to the switch rollers which are actuated by the cams, the cams being shown in their various rotary positions corresponding to the rotary positions of the tool change arm, as depicted in FIGS. 12A to 12K respectively;

FIG. 14 is a diagrammatic view of the hydraulic circuit; and,

FIGS. 15 and 15A constitute a complete electrical wiring diagram of the control circuit for controlling the operation of the tool change arm and tool storage magazine.

Figure 1:
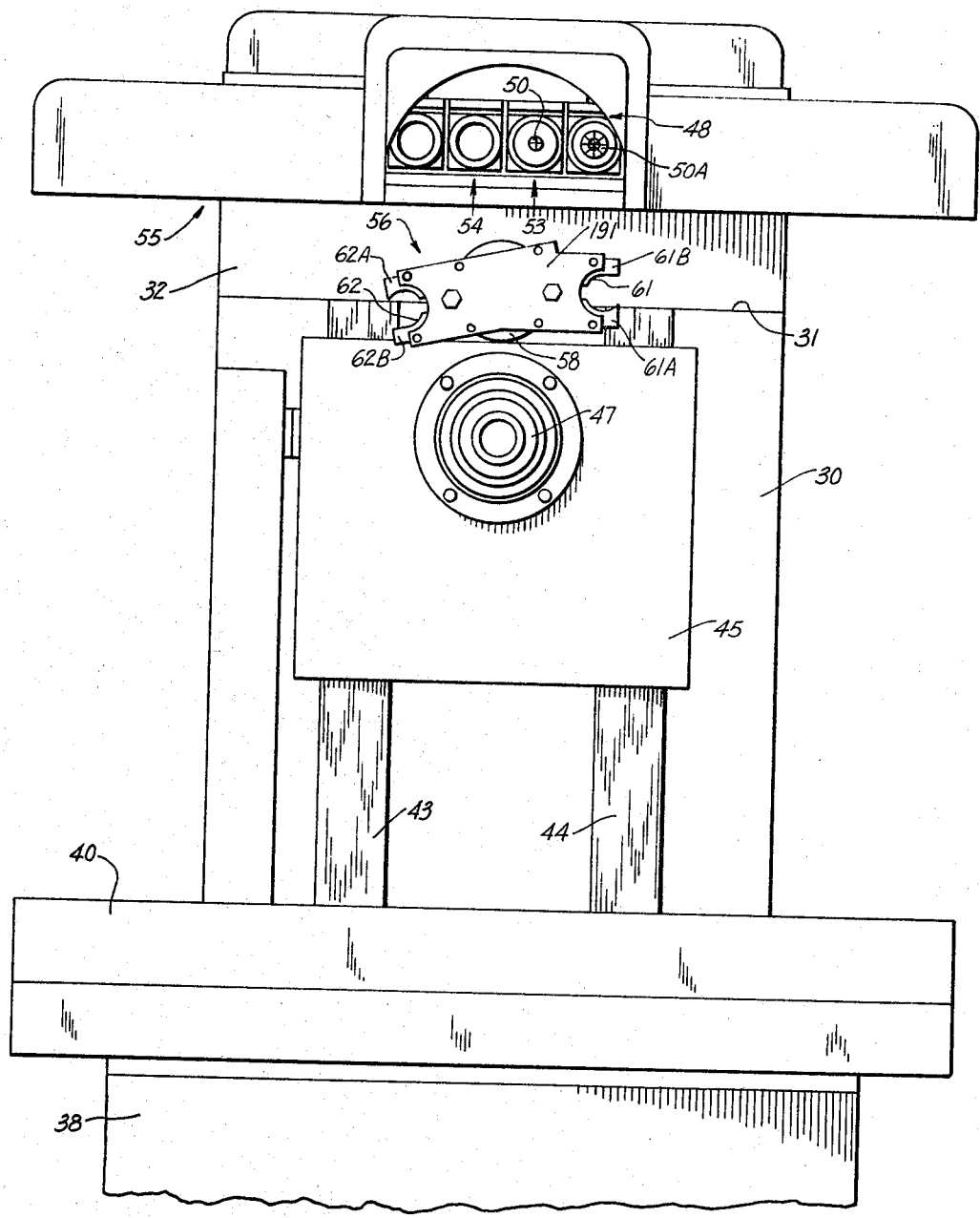
FIGURE 1 is a fragmentary front view of the upper portion of the column of a machine incorporating the features of the present invention, showing the tool change arm in parked position and the tool storage matrix or magazine.

Reference is now made more particularly to the drawings and specifically to FIG. 1 thereof illustrating a machine tool incorporating the features of the present invention. As there shown, the machine generally comprises the usual base (not shown) having an upstanding column 30 presenting an upper horizontal flat surface on which a plate 32 is secured.

The base (not shown) supports a saddle 38 for movement in a horizontal plane towards and away from the column 30. The saddle, in turn, slidably carries a work support or table 40 on suitable guideways (not shown) for longitudinal movement in a direction transverse to the direction of movement of the saddle 38. Movement of the knee, saddle and table may be effected either manually or by power in well-known manner.

The upper front face of the column 30 is provided with vertical guideways 43 and 44 on which a spindle head structure 45 is supported for movement in a vertical path of travel. The vertical movement of the spindle head 45 in either direction is effected in well-known manner, as by rotating a screw (not shown) which operates in a recirculating ball bearing thread nut (not shown). The screw (not shown) is connected to be rotated by power from a motor carried in the column 30.

A spindle 47, which constitutes the operating station of the machine tool, is rotatably carried in the spindle head 45 and is adapted to receive a tool, generally indicated by the reference numeral 48, for performing a machining operation. The spindle 47 is rotated by power obtained from an electric motor 49 which is connected to drive the spindle through the usual transmission (not shown) in a well-known manner.

The machine tool illustrated in FIG. 1 is equipped with an automatically operable mechanical tool changer mounted on the column 30 and constructed in accordance with the teachings of the present invention. To this end, a plurality of tools 48, each having a different cutter 50, are stored in a magazine generally identified by the reference numeral 55. The magazine 55 is secured to the top surface of the plate 32. As shown in FIGS. 1 and 7, the tool storage magazine is provided with two stations, the one generally indicated by the reference numeral 53 is a tool ready station, and the other indicated by the reference numeral 54 is the tool restock station. The tool ready station 53 is located to the right, as viewed in FIGS. 1 and 2, of a vertical line that passes through the axis of the spindle 47, while the tool restock station 54 is located to the left of the vertical line which passes through the axis of the spindle 47.

Figure 2:
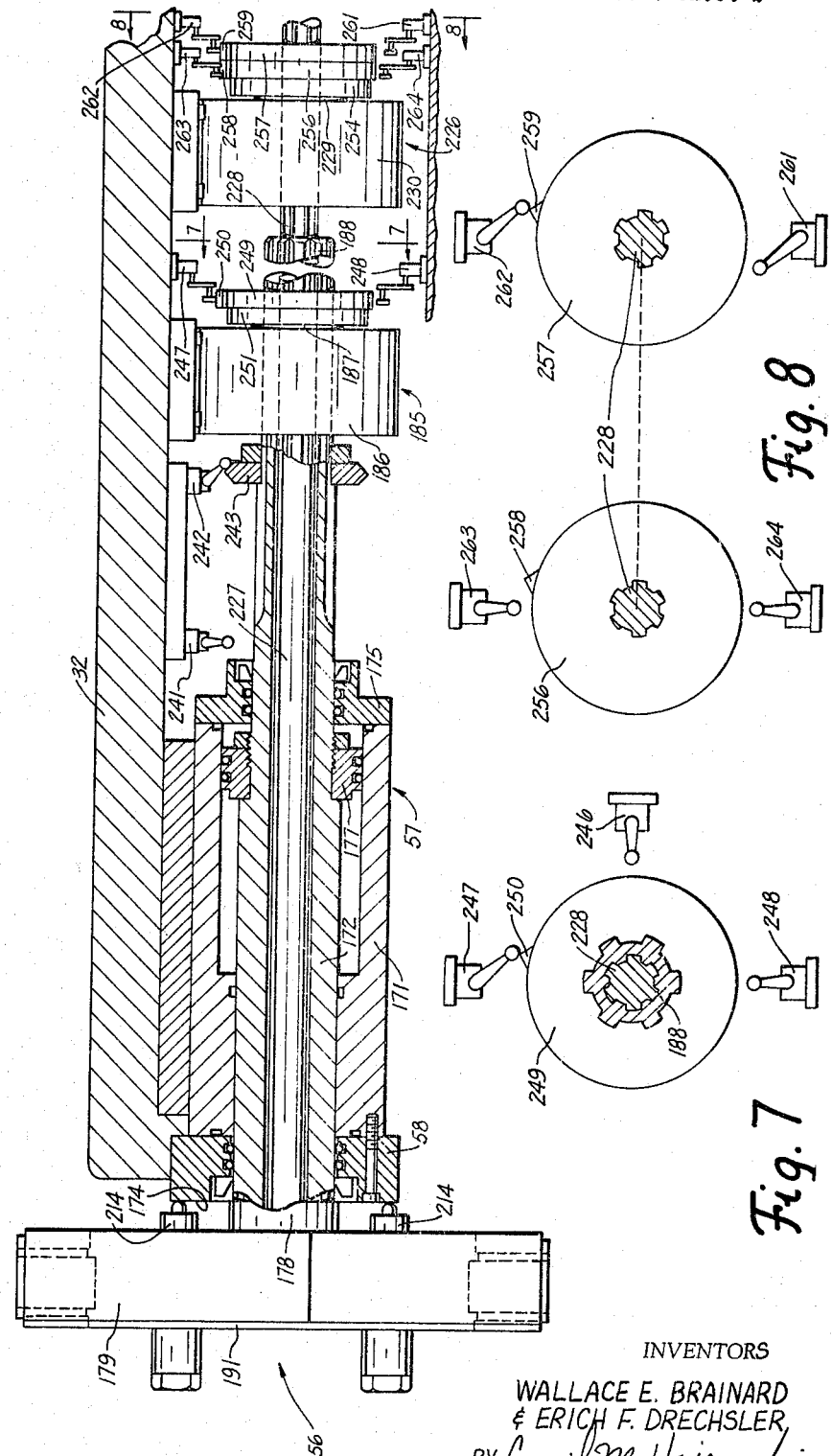
FIG. 2 is a detail view partly in side elevation and partly in vertical section illustrating the tool change arm and operating mechanism therefor.

A tool change arm 56 is carried by a hydraulic unit 57, FIG. 2, which serves to actuate the tool change arm 56 for performing its function of withdrawing a tool from the magazine 55 and inserting it into the spindle 47 to render it operative for performing a machining operation. The tool change arm 56 is a double ended member having extensible grips 61 and 62. The ends of the arm in which the grips 61 and 62 are located are displaced 180° from each other ± one-half of the angle which exists between two imaginary lines that would extend from the axis about which the arm 56 rotates and that pass through the centers of the ready station 53 and the restock station 54 respectively. With this configuration of the arm, when the arm 56 is positioned wherein the grip 61 is adjacent the storage socket in the ready station 53, the grip 62 will be positioned adjacent the spindle 47. On the other hand, upon rotation of the arm 56 to position the grip 61 adjacent the spindle 47, the grip 62 will be moved into a position adjacent a storage socket located in the restock station 54. With this arrangement it is apparent that rotation of the arm 56 in effecting a tool interchange is maintained to a minimum and is always less than 180° of arcuate movement.

When the magazine 55 is indexed to locate the next succeeding tool at the ready station 53, the empty storage socket, in which the tool presently in the spindle 47 had been stored, will automatically be moved into position in the restock station 54. Thus, with the arrangement of the tool change arm 56 described above, when the arm 56 is operated to effect another tool change operation, the grip 61 will engage and remove the new tool from the socket in the ready station 53 and insert it into the spindle 47. Simultaneously therewith, the grip 62 will engage and remove the previously used tool from the spindle 47 and insert it into its original storage socket, which is now located at the restock station 54. At the same time, the tool change arm 56 is operative to withdraw a tool 48 from the spindle 47 and return it to the same storage position in the magazine in which it was originally stored.

The hydraulic unit 57 is supported in the horizontal plane within the column 30 for the purpose of rotating the tool change arm 56 from the parked position, that it occupies in FIG. 1, to an operative position, as depicted diagrammatically in FIG. 12B. When the tool change arm 56 is in the parked position it will not interfere with the movement of the spindle 47 for performing a machining operation. In FIG. 1, the tool change arm 56 is shown located in its parked or inoperative position, being located against the face of a circular face plate 58, FIG. 2, which serves to retain the hydraulic unit within the column. When a tool change is to be effected, the hydraulic unit 57 operates to rotate the tool change arm 56 in a counterclockwise direction from the position depicted in FIG. 12A to a ready position depicted in FIG. 12B where it is properly located for engaging a tool located in the ready station 53 and a tool in the spindle 47.

In addition to moving the tool change arm 56 to and from its parked position in a tool interchange cycle of operation, the hydraulic unit 57 is also operable to effect the extension and retraction of the tool grips 61 and 62 operatively contained in the arm 56. The movement of the grips 61 and 62 into extended positions will engage the grips 61 and 62 with tools in the magazine and spindle respectively.

The tool change arm 56 is a dog leg shaped member, as previously mentioned, with one leg of the member being provided with the tool grip 61 and other leg being provided with an identical tool grip or carrier 62. The two grips 61 and 62 are extendable outwardly of the arm. The tool grip 61 is provided with fingers 61A and 61B and the grip 62 is provided with fingers 62A and 62B. The fingers of each of the grips are provided with semicircular surfaces which together define a recess 66 for receiving a collar 67 secured to each tool 48. The finger 61A and finger 62A of the grips 61 and 62 respectively are movable for positively retaining a tool 48 within the semicircular surface 66 of the grips in a manner to be subsequently described.

FIGS. 12A to 12J, inclusive, diagrammatically illustrate a cycle of operation of the tool change arm 56 in a tool change operation. FIG. 12A shows the tool change arm 56 in its inoperative or parked position located against the face of the plate 58. In response to a proper signal, the change arm 56 will rotate about a horizontal axis in a counterclockwise direction, as viewed from the front of the machine. Such rotation moves the arm 56 to the position depicted in FIG. 12B wherein the grip 61 is disposed adjacent a tool in the magazine previously located in the ready station 53 and the grip 62 is located adjacent the spindle 47. It will be observed that the tool 48 located at the ready station 53 and extending outwardly of the magazine is provided with a drill 50 while the spindle 47 does not have a tool. This condition is illustrated as it would exist at the start of a new work operation. The tool 48 with the cutter 50 is the first tool of a group of tools to be employed in a series of work operations on a workpiece. In a previous operation, the tool that had been in the spindle and which was the last tool used in a work operation was withdrawn from the spindle and replaced in its proper storage position in the magazine. With the tool change arm 56 disposed in the position depicted in FIG. 12B, the grips are extended so that the grip 61 engages the tool 50 in the ready station 53. Simultaneously, the grip 62 is also extended and it would normally engage a tool in the spindle 47. However, since this is the initial tool change, the spindle 47 is not provided with a tool.

With the arm 56 and grips 61 and 62 positioned as illustrated in FIG. 12C, the grip 61 has grasped the tool 50 for the purpose of withdrawing it from the magazine, and in other cycles, the grip 62 would also extract a tool from the spindle. The arm 56 is therefore moved outwardly, away from the front face of the column 30, by the hydraulic unit and the tool 50 (also the tool in the spindle if one were disposed therein) moves with it out of the magazine. As the arm 56 moves outwardly, the fingers 61A and 62A of the grips 61 and 62, respectively, are moved inwardly to securely clamp the tools within the grips.

After the tool or tools have been withdrawn from the magazine and spindle, the grips 61 and 62 are retracted so that upon subsequent rotation of the arm in a tool interchange movement, the grips and tools therein will clear adjacent tools in the magazine. This condition is illustrated in FIG. 12E. Rotation of the arm 56 in a clockwise direction, as viewed from the front of the machine and as indicated by the directional arrows in FIG. 12E, is effected to locate the arm in the position depicted in FIG. 12G wherein the drill 50 is moved adjacent the spindle 47.

With the drill 50 thus positioned, the grips 61 and 62 are again extended thereby moving the drill 50 into axial alignment with the spindle 47. At this time, had the grip 62 removed a tool from the spindle, that tool would now be positioned in axial alignment with the storage position of the magazine located at the restock station 54. When the drill 50 (or tools) has been thus realigned by a turning of the tool change arm 56 of less than 180°, the arm will be retracted or moved inwardly into position against the face of the column 30 to insert the drill 50 into the spindle 47, as illustrated in FIG. 12I. It will be understood that had a tool been withdrawn from the spindle, the grip 62 would operate to insert this tool in its original storage position in the magazine and located at the restock station 54. When the arm 56 is fully retracted, the actuating means associated with the arm for releasing the gripping fingers 61A and 62A of the tool grips 61 and 62, respectively, will operate to move the fingers to an unclamped position thereby releasing the tools from the grips.

With the tool (or tools) released, the grips are retracted as indicated by the directional arrows in FIG. 12I. The arm 56 is now rotated in a counterclockwise direction, as viewed from the front of the machine and as indicated by the directional arrows in FIG. 12J, to return it to the horizontal "parked" position, depicted in FIG. 12K, which position is identical to that depicted in FIG. 12A. A tool change cycle of operation has been completed and the drill 50, which is the first tool to be utilized in the work operation, has been placed in the spindle 47.

With the tool change cycle completed, the magazine is indexed so that the next tool to be used is positioned at the ready station 53. This condition is best illustrated with reference to FIGS. 12K and 12L. In FIG. 12K the positions of the tool change arm 56 and the magazine 55 are illustrated as they exist after the first tool 50 has been inserted into the spindle 47. It is seen that the storage position in which the drill 50 was stored is in the ready station 53. Immediately to the right of the storage position from which the first tool 50 has been removed, another storage position with an end mill 50A stored therein is depicted. The next work operation requires that the mill 50A be utilized. Therefore, the end mill 50A must be placed in the spindle 47 while the drill 50 must be returned to its original storage position in the magazine. To accomplish this, the magazine is indexed in a leftwardly direction to locate its socket 105B in which the end mill 50A is disposed at the ready station 53. This indexing movement will automatically advance the magazine storage socket 105A from which the tool 50 was removed to the "restock" station 54 so that upon the next tool change cycle of operation, the drill 50 will be returned to its original storage socket 105A and the end mill 50A will be inserted into the spindle 47.

Figure 9:
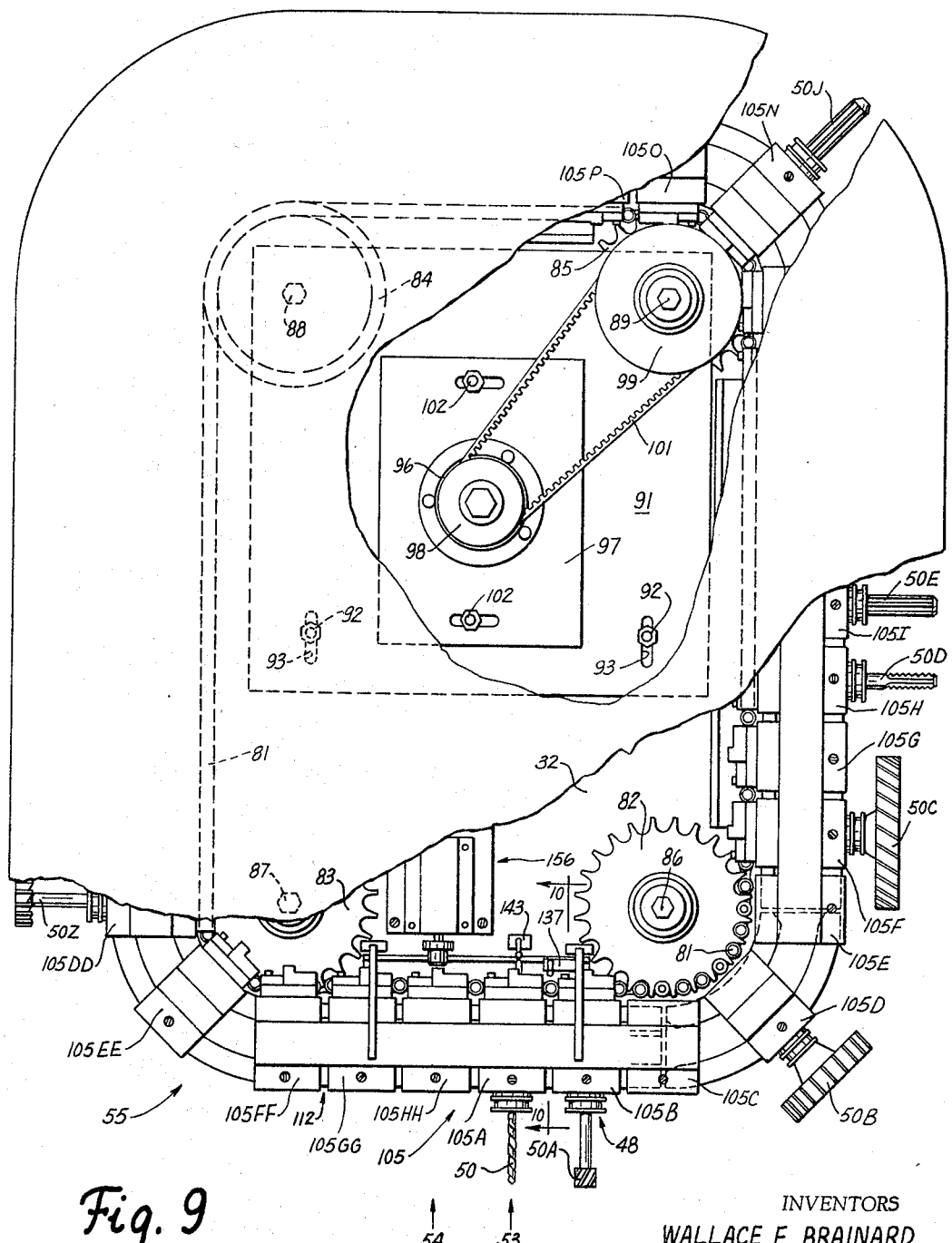
FIG. 9 is a plan view of the tool storage magazine shown in FIG. 1, with parts broken away to reveal the drive mechanism.
Figure 11:
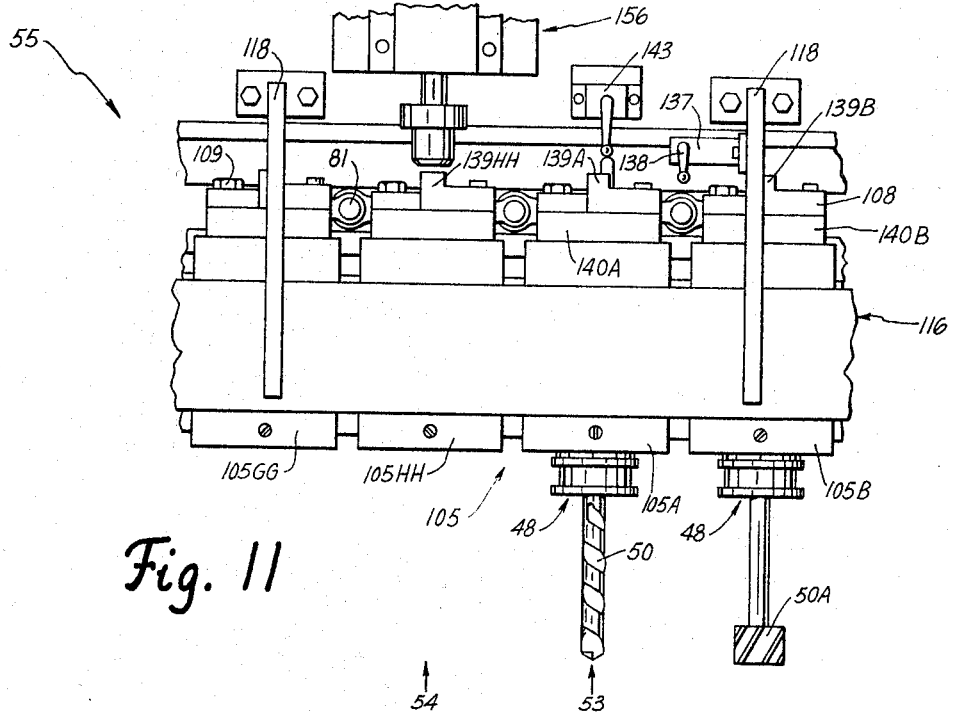
FIG. 11 is an enlarged fragmentary plan view of the storage magazine showing the forward storage sockets, depicted in FIG. 9, the counting switches and the shot pin arrangement for accurately locating the selected socket in the ready position.
Figure 10:
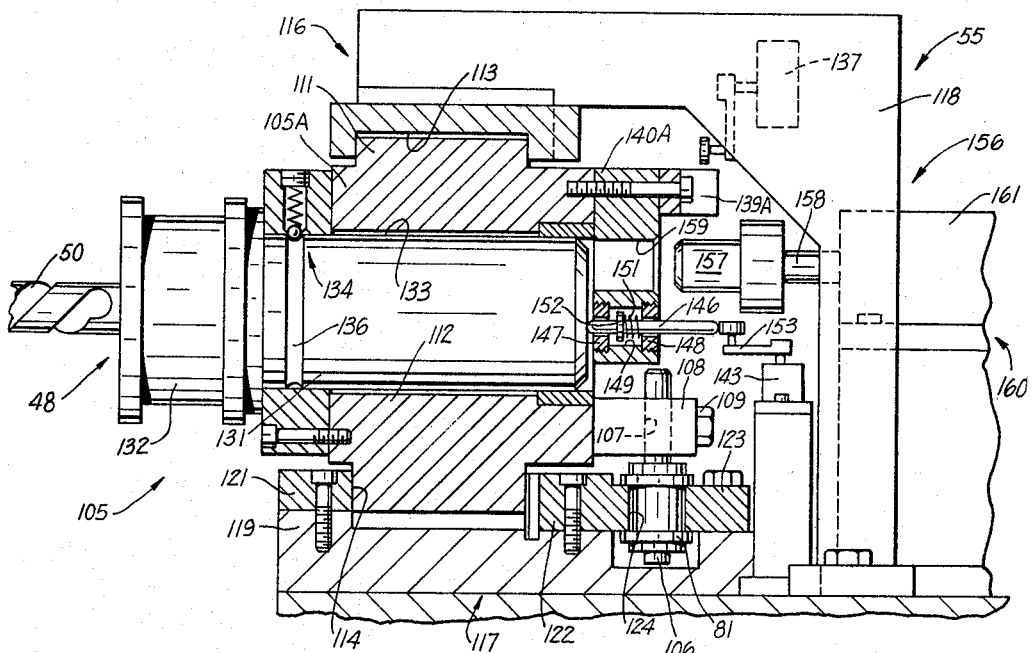
FIG. 10 is an enlarged detail view partly in vertical section and partly in elevation through a storage socket of the magazine located at the ready station, taken along the plane represented by the line 10—10 in FIG. 9.

The tool storage magazine in which the plurality of tools are stored is best shown in FIGS. 9, 10 and 11. As shown, the magazine comprises an endless chain 81 which is guided for travel in a horizontal rectangular path by sprockets 82, 83, 84 and 85. The forward sprockets 82 and 83 are fixedly secured on the upper ends of stub shafts 86 and 87, respectively, that are rotatably supported in vertical upright positions at the front right and left corners of the plate 32. The rear sprockets 84 and 85 are fixedly secured on the upwardly extending ends of stub shafts 88 and 89 that are rotatably journaled in upright vertical positions in the right and left rear corners of an adjustable base plate 91. Thus, the endless chain 81 is guided for movement in a horizontal plane and the tension of the chain may be adjusted by moving the base plate 91 either forwardly or backwardly as needed. The base plate 91 is maintained in adjusted position on the plate 32 by means of screws 92 which pass through elongated openings 93 formed in the base plate and which are threadedly engaged in suitable openings [not shown] provided on the plate 32.

Selective movement of the endless chain 81 in either direction is effected by the operation of a reversible hydraulic motor 96. The motor 96 is secured to an adjustable plate 97 and is provided with a driving pulley 98 that is fixedly secured to the motor output shaft. From the pulley 98, the power of the motor 96 is transmitted to a pulley 99 via an endless belt 101. The pulley 99 is secured to the shaft 89 in well-known manner to effect rotation of the shaft and thereby the drive sprocket 85. Tension of the belt 101 may be adjusted by moving the plate 97 either leftwardly or rightwardly, as viewed in FIG. 9, as desired and the plate may then be secured in adjusted position by means of screws 102. The screws 102 are engaged in elongated openings 103 formed in the plate 97 and which are threadedly engaged in suitable openings [not shown] formed in the base plate 91.

The tools 48 are stored in individual storage sockets or receptacles 105 constituting storage positions of the magazine. The individual sockets, generally identified by the reference number 105, are identical in construction and are secured to the chain 81 so as to move with the chain in same manner. Therefore, similar parts of each socket will be identified by the same reference number except that the general socket identifying number followed by a letter suffix will be used to identify the individual sockets. As shown in FIG. 10, the sockets 105 are attached at spaced locations along the length of the chain. The storage sockets 105 are pivotally secured to the chain 81 by means of connecting pins 106. The connecting pins 106 extend upwardly from the chain and engage an opening 107 formed in a bar 108 which is secured by screws 109 to the back surface of the socket 105. Each socket is shown as a single piece having an upper and a lower guide 111 and 112 which are adapted to be slidably constrained within cooperating guideways 113 and 114 formed in upper and lower guide structures 116 and 117.

The upper guide structure 116 is an elongated channel member suspended in inverted position from L-shaped brackets 118 which are secured to the plate 32. The lower guide structure 117 comprises an elongated bottom plate 119 which is secured to the plate 32. Elongated side bars 121 and 122 define the lower guideway 114 in which the socket guide 112 slides. Cooperating with the rear side bar 122 is a chain guide bar 123 which, in cooperation with the vertical rear surface of the bar 122, defines a guideway 124 in which the chain 81 slides. As illustrated in FIG. 9, the lower guide 117 is formed in a series of abutting portions and comprises front and rear, and left and right straight sections which are linked by curved corner sections. The assembled portions forming a continuous rectangular lower guide 117. The upper guide 116 serves as a stabilizer and as such, comprises only straight sections which are interrupted at the four corners.

The tool 48 has been referred to generally but, as shown in FIG. 10, it comprises the cutter 50 extending into a cylindrical shell 131 having suitable releasable securing means (not shown) for holding the cutter. The forward end of the shell 131 is provided with an enlarged external circular portion which serves as a gripping collar 132 on which the grips 61 and 62 of the tool change arm 56 clamp to secure the tool to the arm.

In order to store one of the tools 48 in a storage socket 105, the portion of the shell 131 which extends rearwardly of the collar 132 is inserted into the axial bore 133 formed in the storage socket. The tool is yieldably retained within the socket 105 by a detent mechanism 134 which is adapted to engage in an annular groove 136 formed in the periphery of the shell 131.

Movement of the storage sockets is effected through the operation of the motor 96, described herein as a hydraulic motor. However, it is to be understood that an electric motor could likewise be utilized for the purpose. As the motor 96 operates to index the magazine 55 for locating the next succeeding tool at the ready station, a limit switch 137 is actuated to count the sockets as they move in their paths of travel. The limit switch 137 operates to count each socket irrespective of whether a tool is stored therein or not. As shown in FIG. 11, the limit switch 137 is secured to bracket 118 in position so that its actuating arm 138 will be engaged by an outwardly projecting dog 139 which is secured to the rear surface of a locating block 140. Location of the arm 138 is such that the limit switch 137 is actuated prior to the storage socket being positioned at the ready station 53. In addition to counting the storage sockets, it is also necessary to recognize a socket with a tool therein.

This is necessary because when a large tool is stored in the magazine 55 the sockets on either side of the socket in which the large tool is stored must be left empty to provide clearance for the large tool. Thus, if a large tool is the next succeeding tool to be moved into the ready station 53, it will be preceded by an empty storage socket. Under this condition it is necessary to provide a sensing means which is operable to sense whether or not a storage socket that is just moving into the ready station 53 is or is not provided with a tool therein. If the storage socket that is being moved into the ready station 53 does not have a tool, this condition is sensed and the information relayed to the control circuit so that the movement of the magazine is not terminated until a socket with the next succeeding tool is in position to move into the ready station. Thus, the sensing means must be operable to sense whether or not a storage socket has a tool therein. To this end, the limit switch 143 is provided and located at the ready station 53.

In order that the limit switch 143 will be actuated when a storage socket with a tool therein is in the ready station, a tool switch actuating mechanism is provided. As shown in FIG. 10, this mechanism comprises a plunger 146 which is slidably carried in bushings 147 and 148. The bushings 147 and 148 are threadedly engaged in the opposite ends of a horizontal bore 149 formed in the locating block 140. One end of a spring 151 abuts a collar 152 integrally formed on the plunger 146, while the opposite end of the spring abuts the end of the bushing 148. Thus, the plunger 146 is constantly biased leftwardly, as viewed in FIG. 10, by the spring 151. Therefore, when a storage socket 105 does not have a tool stored therein, the plunger 146 will be in an extreme leftwardly position wherein the collar 152 abuts the end of the bushing 147. In this position, the right end of the plunger 146 cannot engage the actuating arm 153 of the switch 143 and the switch remains deactuated. On the other hand, with a tool 48 stored within the socket 105, the inner end of the tool will engage the adjacent end of the plunger 146 forcing the plunger 146 rightwardly, as depicted in FIG. 10. With this condition existing, the rightwardly extending end of the plunger 146 will extend sufficiently far so that it will engage the arm 153 to actuate the tool sensing limit switch 143, when the particular socket is in the ready station 53.

Actuation of the limit switch 143 will interrupt the operation of the magazine drive motor 96 to stop the magazine. In addition, the actuated limit switch 143 will also operate to effect the operation of a shot-pin locating mechanism 156 for effecting precise positioning of sockets at the ready station 53 and also at the restock station 54. The shot-pin mechanism 156 comprises a pin 157 which is secured to the extending end of a rod 158. The pin 157 is adapted to register in a complementary bore 159 formed in the locating block 140. Movement of the shot-pin 157 is effected by a hydraulic actuator 160 comprising a cylinder 161 in which a piston 162, FIG. 14, is supported for reciprocating movement. The rod 158 is secured to the piston to move with it.

Operation of the tool change arm 56 to effect an interchange of tools between the storage magazine and the spindle is accomplished through the operation of the hydraulic unit 57. As shown in FIG. 2, the hydraulic unit 57 comprises a cylinder 171 which is disposed in a suitable opening formed in the column 30 and secured to the bottom surface of the plate 32. A hollow piston rod 172 extends through the cylinder 171 and is supported therein for rotation and axial reciprocation. The circular face plate 58 is secured to the left end of the cylinder 171, as viewed in FIG. 2, and extends inwardly from the front of the machine column 30. The outer front face 174 of the face plate serves as an abutment surface for effecting the operation of the grips 61 and 62 in an unclamping action to be subsequently described. The face plate 58 also serves as an end seal for the cylinder 171. An end cap 175, through which the piston rod 172 extends, is secured to the inner or right end of the cylinder 171 and serves both as an end closure for the cylinder and a support for the intermediate portion of the rod 172. A piston 177 is detachably secured to a reduced portion of the piston rod 172 and is disposed to reciprocate within a suitable bore provided in the cylinder 171 to effect axial movement of the rod 172. The tool change arm 56 is secured to the outer or leftwardly extending end of the piston rod 172 so that the arm will move bodily with the piston rod, both in its rotational and axial movements. Thus, axial movement of the piston 177 in a leftwardly direction from the position it occupies in FIG. 2, will effect movement of the arm 56 in a direction to extend it away from the front face of the column 30. In this movement, the arm will operate to withdraw a tool from the spindle and also from the storage socket located at the ready station 53. On the other hand, rightward movement of the piston 177 to retract it to the position it occupies in FIG. 2, will effect the retraction or inward movement of the arm 56. In this movement, the arm 56 will operate to insert a tool in a storage socket located at the restock station 54 and into the spindle 47.

As previously mentioned, the arm 56 is adapted to be rotated in a counterclockwise direction from the parked position that it occupies in FIGS. 1 and 12A to a tool change position depicted in FIG. 12B, and as indicated by the directional arrows in FIG. 12A. After the arm 56 has operated to withdraw tools from the storage socket located at the ready station 53 and the spindle 47, the arm will be rotated in a clockwise direction, as indicated by the directional arrows in FIG. 12E to the tool change position, depicted in FIG. 12G.

Rotation of the tool change arm 56 in a tool change cycle of operation is effected while the arm is in its retracted position, as well as when it is in an extended position. Rotation of the arm in either of its two axial positions is effected by means of a hydraulic motor 185. The motor 185 includes a housing or frame 186 which is secured in operative position to the undersurface of the plate 32, as shown in FIG. 2. A hollow internally splined output shaft 187 of the motor 185 is adapted to receive the extending reduced spline portion 188 of the shaft 172 in a manner to form an operable rotatable drive connection between the motor output shaft 188 and the piston rod 172 and the connection is maintained while the tool change arm 56 is in its extended position as well as in its retracted position.

As previously mentioned, the arm 56 has a dog leg configuration in which its ends are disposed 180° from each other ± one-half of the angle from the arm center subtended by two adjacent storage sockets. The direction of displacement depends upon the relative directions of storage magazine and tool arm movement. Thus, when interchanging small diameter tools which have been stored in adjacent storage sockets, the angular offset in the tool change arm 56 will serve to automatically return the previously used tool extracted from the spindle 47 to its original storage socket which wil lthen be located in the restock station 54.

Figure 3:
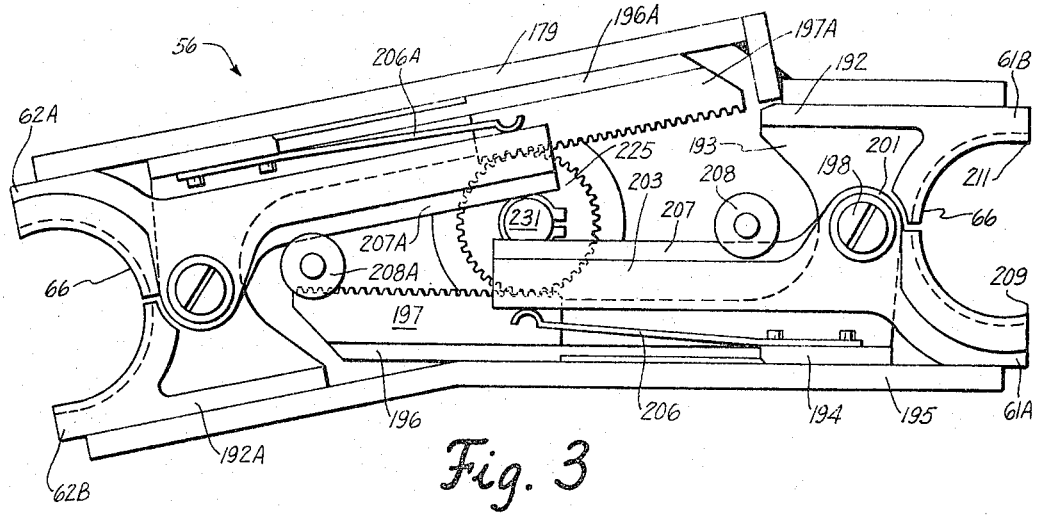
FIG. 3 is a view of the tool change arm shown in FIG. 1 with the front cover plate removed to reveal the mechanism for operating the two grips.

The arm 56 comprises a housing 179 which is normally closed by a cover 191. In FIG. 3, the cover 191 has been omitted from the arm housing to clearly show the mechanism for extending and retracting the grips 61 and 62, and also the mechanism for actuating the movable fingers 61A and 62A of each of the grips. The grips 61 and 62 and their associated actuating mechanism are substantially the same in construction and operation. Therefore, a description of the grip 61 will be given and the description will also pertain to the grip 62. Similar parts will be identified by the same reference numerals with letter suffixes to distinguish the parts of one grip from the parts of the other grip. As shown in FIG. 3, the grip 61 comprises a stationary upper finger 61B which is integrally formed with and projects forwardly from a horizontally disposed leg 192 of a channel shaped body member 193. The lower horizontal leg 194 of the member 193 serves as a support which slides on the inner surface of adjacent side wall 195 of the arm housing 179. The lower leg 194 and an adjacent portion of the web of the body member 193 extends rearwardly to form an L-shaped tail portion 196 which serves as a stabilizer for the grip 61. A gear rack 197 is secured to the tail portion 196. The movable finger 61A of the grip is pivotally connected to the stationary finger 61B by means of pivot screw 198 which extends through a suitable opening provided in a hub 199 integrally formed on a projection 201 of the finger 61A. The screw 198 is threadedly engaged in a suitable opening provided in a cooperating laterally extending hub 202, FIG. 4, integrally formed on the web of the body member 193.

The pivotable finger 61A is formed with a rearwardly projecting extension 203 which is disposed to overlay a portion of the horizontal lower leg 194 of the tail 196.

Figure 4:
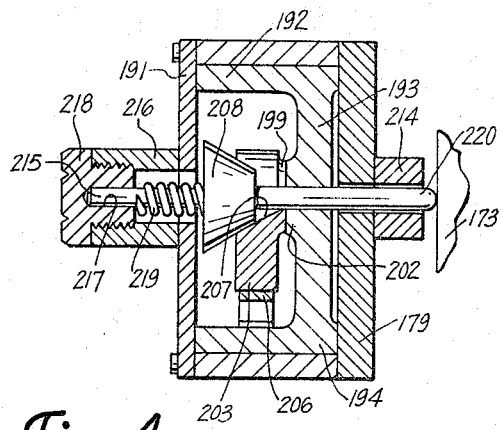
FIG. 4 is a detail view in transverse section taken through the arm showing the cam mechanism for effecting the clamping and releasing of a tool change arm grip, the mechanism being illustrated with the grip in retracted and released position.
Figure 6:
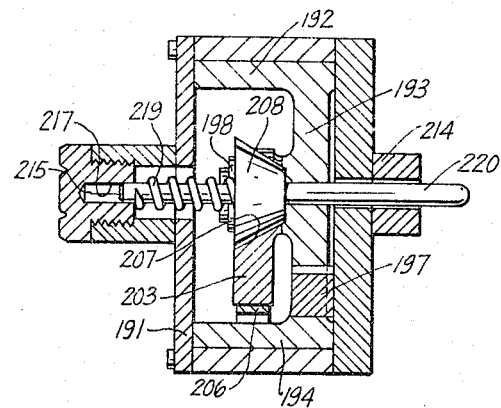
FIG. 6 is a view in transverse section taken through the arm, showing the relationship of the parts when the grip is in its extended and clamped position.
Figure 5:
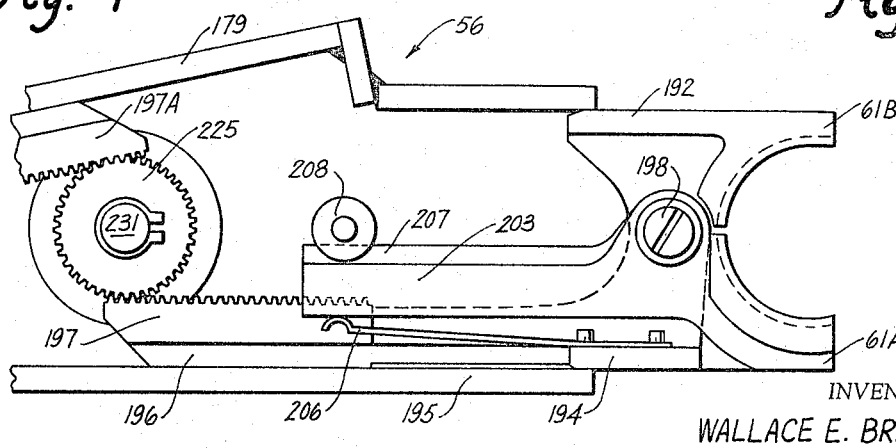
FIG. 5 is a fragmentary detail view of the tool change arm showing one grip in its extended position.

A leaf spring 206 secured by screws to the laterally extending lower leg or base 194 extends rearwardly and engages the undersurface of the projecting extension 203 of the pivotal finger 61A. The spring 206 serves to exert a force upon the end of the tail portion 203 to counteract the weight thereof so that the finger 61A is normally biased into an open position, as depicted in FIG. 3. To effect a clamping of the grip 61, the finger 61A must be pivoted about the screw 198 in a counterclockwise direction. To this end, the upper edge of the tail extension is formed with a bevel surface 207, FIGS. 3 and 4. A cam 208 of frusto-conical configuration is disposed so that its peripheral surface engages the bevel surface 207 of the tail extension 203. Axial bodily movement of the cam toward the extension 203 causes the cam 208 to exert a downwardly acting force upon the tail portion 203 of the finger. This force overcomes the force exerted by the leaf spring 206 to effect a pivotal movement of the finger 61A in counterclockwise direction about the screw 198 to actuate the grip 61 in a clamping action. In FIG. 4, the cam 208 is shown disposed in its inoperative position wherein the spring 206 is not counteracted by the cam 208. Therefore, the finger 61A is biased in a clockwise direction and the grip 61 is unclamped. On the other hand, when the cam 208 is moved into forceful engagement with the bevel surface 207 of the tail extension 203, as depicted in FIGS. 5 and 6, the force exerted by the cam on the tail extension will force the finger 61A to pivot about the screw 198 in a counterclockwise direction. Under this condition, the grip 61 will be clamped. It is to be understood that the movement imparted to the movable finger 61A is relatively slight but sufficient so that with the grip in clamped position, the finger 61A firmly engages the peripheral surface of the collar 132 of a tool within the recess 66 of the grip. On the other hand, when the grip 61 is unclamped, the finger 61A is pivoted so that its retention edge 209 is spaced from the cooperating edge 211 of the stationary finger 61B a distance which is slightly greater than the diameter of the collar 132 of a tool 48.

Movement of the cam 208 in a clamping or unclamping action is effected automatically and is dependent upon the axial position of the arm 56. Whenever the tool change arm 56 is in its retracted position against the column 30, the grips 61 and 62 are unclamped. On the other hand, when the arm 56 is in extended position, the grips 61 and 62 are simultaneously clamped. To this end, the cam 208 is integrally formed on an actuating member or rod 215 and is disposed substantially intermediate the ends thereof, as shown in FIGS. 4 and 6. As viewed in FIGS. 4 and 6, the rod 215 extends rightwardly and slidably extends through suitable axially aligned openings formed in the web of the channel member 193, the adjacent wall of the housing 179, and a boss 214 that is welded or otherwise secured to the outer surface of the wall of the housing 179. The opposite end of the rod 215 extends through axially aligned openings formed in the cover 191 and a hub 216 and into an axial bore 217 formed in a removable threaded plug 218 engaged in the hub 216. A spring 219 is engaged about the leftwardly extending end of the rod 215 and abuts the base of the cam 208 and the inner end of the plug 218. With this arrangement, the spring 219 constantly urges the cam 208 and its actuating rod 215 rightwardly, as viewed in FIGS. 4 and 6. However, when the tool change arm 56 is in retracted position, the outer end 220 of the rod 215 is forcefully engaged against the outer surface of the face plate 58, as depicted in FIGS. 2 and 4. Thus, the rod 215 is forced leftwardly which, in turn, moves the cam 208 leftwardly to the position shown in FIG. 4, wherein it does not exert a force on the tail extension 203. The leaf spring 206 is therefore operative to pivot the finger 61A to an unclamped position. On the other hand, when the arm 56 is in extended position, away from the column 30, the coil spring 219 operates to move the cam 208 axially rightwardly into the position depicted in FIG. 6. In this position, the cam 208 exerts a force on the tail extension 208 of the finger 61A causing the finger 61A to pivot in a counterclockwise direction about the screw 198 into tool clamping position.

As previously mentioned, the grips 61 and 62 are movable into an extended position relative to the housing 179, as depicted in FIG. 5, or into a retracted position, depicted in FIG. 3. To effect the extension and retraction of the grips 61 and 62, a pinion 225, illustrated in FIGS. 3 and 5, is disposed in meshing engagement with the gear rack 197. It will be noted that the pinion 225 also is in meshing engagement with the gear rack 197A that is associated with the grip 62. Thus, as viewed in FIG. 3, rotation of the pinion 225 in a counterclockwise direction will move the gear racks 197 and 197A outwardly to effect movement of their associated grips 61 and 62, respectively, to their extended positions, shown in FIG. 5. On the other hand, clockwise rotation of the pinion 225 will effect the movement of the grips 61 and 62 to their retracted positions, shown in FIG. 3.

Rotation of the pinion 225 in either direction is effected by power from a hydraulic motor 226, FIG. 2. The power from the hydraulic motor 226 is transmitted by a drive shaft 227 disposed within the hollow shaft 172. The shaft 227 rotates and moves axially with the shaft 172, but is also adapted to be rotated independently relative to the shaft 172. As viewed in FIG. 2, the rightward end 228 of the shaft 227 extends through the hollow output shaft 229 of the motor 226. A drive connection between the motor output shaft 229 and the shaft 227 is established by the splined portion 228 of the shaft 227 which meshes with complementary internal splines (not shown) formed in the interior of the hollow output shaft 229. With this arrangement, a drive from the motor 226 to the shaft 227 is maintained for any axial position to which the shaft may be moved. The motor 226 is secured in operative position within the column 30 by means of screws that extend through suitable openings provided in the base flange of the motor housing 230, and which are threadedly engaged in the plate 32. The opposite or leftward end 231 of the shaft 227 extends into the arm housing 179, FIGS. 3 and 5, and receives the pinion 225, which is secured thereto for rotation with the shaft and also to move axially with it.

Thus, the arm 56 may be bodily moved in an extending movement away from the column 30 or be moved in a retracting movement towards the column, through the operation of the motor 57. During extension of the arm 56, the rotational drive connection between the shaft 172 and the motor 185 is maintained by reason of the splined engagement between the shaft 172 and the output shaft 187 of the motor. In addition, the inner shaft 227 will also rotate and move axially with the outer shaft 172. The inner shaft 227 rotates with the outer shaft or piston rod 172 because of the engagement effected between the rack 197 and pinion 225, shown in FIG. 3. Thus, when the outer shaft 172 is rotated by the motor 185 to effect the angular displacement of the arm 56, the racks 197 and 197A move with the arm 56 and operate as drivers to effect rotation of the pinion 225. The pinion 225, in turn, will thereupon effect rotation of the shaft 227. In these movements, the drive connection between the shaft 227 and the motor 226 is maintained by reason of the splined connection established between the shaft 227 and the output shaft 229 of the motor. The shaft 227 may be rotated independently of the shaft 172 to effect the extension or retraction of the grips 61 and 62 in any axial or rotary position of the arm 56.

The completion of each movement of the tool change arm 56, as well as the position of the grips 61 and 62, must be indicated in the electrical control system to condition it for the succeeding step in the tool change cycle. The extended and retracted positions of the arm 56 are indicated in the electrical control system by the actuation of limit switches 241 and 242, respectively, when these positions of the arm have been established. Thus, as depicted in FIG. 2, with the arm 56 in retracted position, the limit switch 242 is actuated by a circular cam 243 which is mounted about the shaft 172 and secured thereto for axial and rotational movement with the shaft. It is apparent that the circular configuration of the cam 243 serves to actuate the switch 242 whenever the arm 56 is in retracted position and in any angular position thereof. On the other hand, when the arm 56 has been moved to the extended position, the cam 243 will actuate the limit switch 241 regardless of the angular position of the arm.

The completion of each rotary movement of the tool change arm is indicated by three limit switches 246, 247 and 248, best shown in FIGS. 2 and 7. These switches are mounted in the column 30 and are angularly disposed about the shaft 172. The three limit switches 246, 247 and 248 are controlled by a cam 249 having a single switch actuating point or dog 250. As depicted in FIG. 2, the cam 249 is secured to the face of an external radial flange portion 251 of the motor output shaft 187. Thus, as the motor 185 is operated to effect the rotation of the shaft 172 for rotating the arm 56, the cam 249 will also be rotated so that the dog 250 will be rotated a like amount. Therefore, when the arm 56 is rotated from the parked position, depicted in FIGS. 1 and 12A, to the ready position, depicted in FIGS. 2 and 12B, the cam 249 will also be rotated from the position in FIG. 13A to the position shown in FIG. 13B, wherein the dog 250 will engage the roller of the switch actuating arm to actuate the switch 247. On the other hand, when the arm 56 is rotated into the change position, depicted in FIG. 12G, the cam 249 will be rotated to position the dog 250 in engagement with the roller of the actuating arm of the switch 248, depicted in FIG. 13G, to actuate the limit switch. As previously mentioned, the tool change arm 56 is positionable into a horizontal position either when the arm 56 is in retracted position or when the arm 56 is in extended position. In the former case, that is when the arm 56 is in the retracted horizontal position depicted in FIGS. 1, 12A and 12K, it is in the parked position. With the arm 56 in the parked position, the cam 249 is angularly displaced so that the dog 250 is in engagement with the roller of the actuating arm of the switch 246, depicted in FIGS. 13A and 13K, so that the switch 246 is actuated. This switch is also actuated when the arm 56 is in extended horizontal position, depicted in FIG. 12F, because axial movement of the arm 56 does not effect an axial displacement of the cam 249. Therefore, when the arm 56 is operated to withdraw a tool from the storage socket of the magazine located at the tool ready station 53 and thereafter rotated from the position depicted in FIG. 12E into the horizontal extended position depicted in FIG. 12F, the cam 249 will also be rotated to position the dog 250 in engagement with the roller of the actuating arm associated with the limit switch 246, as shown in FIG. 13F, and the switch is therefore actuated.

As previously mentioned, the motor 226 is operable to rotate the inner shaft 227 for effecting the selected positioning movement of the grips 61 and 62 to an extended or retracted position. However, it will also be recalled that the inner shaft 227 rotates with the rotation of the outer shaft or piston rod 172. Since the inner shaft 227 is independently rotatable by its own motor 226, and also rotates with the outer shaft 172, it is necessary that four limit switches 261, 262, 263 and 264 be provided to indicate in the electrical system the position of the grips 61 and 62. The four limit switches are associated together in pairs, the limit switches 261 and 262 constitute one pair and serve to indicate the position of the grips when the inner shaft 227 is rotated by its associated motor 226. The limit switches 263 and 264 are paired and serve to indicate the position of the grips whenever the inner shaft 227 is angularly displaced by rotary movement of the arm 56. These limit switches are under the control of a pair of cams 256 and 257 that are secured in axial alignment to a radial flange 254 provided on the output shaft 229 of the motor 226. Thus, when the inner shaft 227 is rotatably driven by the angular displacement of the arm 56, the output shaft 229 of the motor 226 is rotatably driven which, in turn, effects a like angular displacement of the cams 256 and 257. On the other hand, the cams 256 and 257 are also rotated whenever the motor 226 is operated to effect the extension or retraction of the grips 61 and 62. However, when the cams 256 and 257 are rotated by the angular displacement of the tool change arm 56, the amount of angular displacement imparted to the cams is the same as that imparted to the arm. Thus, when the arm is rotated in a counterclockwise direction from the parked position it occupies in FIG. 12A to the ready position depicted in FIG. 12B, the cams 256 and 257 rotate a like angular distance, as depicted in FIGS. 13A and 13B. In this case, both of the cams 256 and 257 rotate a like angular amount but the switches 263 and 262 associated with the cams 256 and 257 respectively are disposed in a manner that with the arm 56 in the ready position depicted in FIG. 12B, the dog 258 associated with the cam 256 will have been moved to the position depicted in FIG. 13B, and does not actuate the switch 263. On the other hand, the dog 259 associated with the cam 257 will also be moved a like angular amount but its associated switch 262 is positioned so that the dog 259 actuates the switch to thereby indicate in the electrical control circuit that the grips 61 and 62 are in a retracted position. With the arm 56 and the associated cams in the positions depicted in FIGS. 12B and 13B, when the motor 226 is operated to move the grips 61 and 62 from their retracted positions to extended positions depicted in FIG. 12C, the cams 256 and 257 will be rotated 180° relative to the tool change arm 56 from the position in FIG. 13B to the position depicted in FIG. 13C. In this movement, the dog 258, moving with its associated cam 256, will move in a clockwise direction in 180° of arcuate travel and in doing so, will momentarily actuate the limit switch 264. This has no effect on the control circuit at this time. However, the dog 259 associated with the cam 257 will also be rotated in a like amount, but its associated switch 261 is positioned so that upon completion of the movement, the dog 259 will be positioned to actuate and maintain the switch in actuated condition, as depicted in FIG. 13C. Now assuming that the grips 61 and 62 are in extended positions and that the arm 56 is in an extended ready position as depicted in FIG. 12D. Under this assumed condition, in order to rotate the arm 56 from the ready position to the interchange position it is first necessary to retract the grips 61 and 62. The motor 226 is energized to effect the retraction of the grips, which will also cause the cams 256 and 257 to be rotated 180° relative to the tool change arm 56. In this movement of the cams 256 and 257, the associated dogs 258 and 259 respectively will move a like angular amount and be displaced from the positions they occupy in FIG. 13D to the positions depicted in FIG. 12E. Thus, both of the dogs 258 and 259 rotate 180° but their associated switches 263 and 262 are located so that only the dog 259 is in position to actuate its associated switch 262, depicted in FIG. 13E, to indicate in the control system that the grips 61 and 62 have been retracted. The motor 185 will now be energized to rotate the tool change arm in a clockwise direction from the extended ready position it occupies in FIG. 12E to an extended interchange position depicted in FIG. 12G. In this movement of the arm 56, the arm position cam 249 and the grip position cams 256 and 257 will be rotated a like angular amount. Therefore, the dogs 250, 258 and 259 associated with the cams 249, 256 and 257 respectively will be rotated the same angular amount that the arm 56 is rotated and they will be moved from the positions they occupy in FIG. 13E to the positions depicted in FIG. 13G. In this movement, the arm 56 is rotated an angular amount which is less than 180° and therefore the cams 249, 256 and 257 will be rotated the same angular amount which is less than 180°. Thus, the dog 250 associated with the arm position cam 249 will be rotated from the position it occupies in FIG. 13E to the position depicted in FIG. 13G to actuate the switch 248 and indicate in the control system that the arm is in the interchange position. The grip position cams 256 and 257 will also be rotated the same angular amount as the arm 56 is rotated and therefore the dogs 258 and 259 associated with the cams 256 and 257, respectively, will be moved from the positions they occupy in FIG. 13E to the positions depicted in FIG. 13G. In this movement of the cams 256 and 257, the dog 258 associated with the cam 256 will be moved into actuating engagement with the associated switch 264. On the other hand, the dog 259 associated with the cam 257 will also be moved the same angular distance but its associated switch 261 is positioned 180° from the companion switch 262. Therefore, since the amount of rotation imparted to the cam 257 is less than 180°, the dog 259 will not be moved sufficiently far enough to actuate the associated switch 261. Assuming now that the arm 56 is in the interchange position depicted in FIG. 12H and that it is desired to move the grips from the retracted position depicted in FIG. 12G to the extended position shown in FIG. 12H. To effect this movement of the grips, the motor 226 will be energized. Operation of the motor 226 to extend the grips 61 and 62 will also rotate the cams 256 and 257 180°. Therefore, the dog 259 associated with the cam 257 will be displaced 180° from the position it occupies in FIG. 13G to the position depicted in FIG. 13H. Since the associated switches 261 and 262 are spaced diametrically opposite each other and are positioned to the left and right hand sides, respectively, of a vertical line passing through the axis about which the cams rotate, the 180° of movement imparted to the cam 257 will move the dog 259 from a vertical upwardly extending position. In this movement of the cam 257, the dog 259 in moving in its path of travel will momentarily actuate the switch 262, but such action has no effect on the control system. On the other hand, the dog 258 associated with cam 256 will also be displaced 180° and will be moved out of engagement with the associated switch 264 and into actuating engagement with the switch 263, depicted in FIG 13H, that is located in the vertical plane 180° from the switch 264 to indicate in the control system that the grips 61 and 62 are in extended positions. Thus, whenever the tool change arm 56 is in the ready position, the positions of the grips 61 and 62 are indicated in the control system by the switches 261 and 262. On the other hand, when the arm 56 is in the interchange position, the positions of the grips 61 and 62 are indicated in the control system by the switches 263 and 264.

As previously mentioned, the cam 256 controls the pair of limit switches 263 and 264 that are disposed within the column 30, 180° apart and in positions wherein the rollers of their associated actuating arms are in the angular path of travel of the dog 258. In a similar manner, the cam 257 controls the limit switches 261 and 262 that are also disposed within the column 30 being displaced relative to each 180°. The position of these limit switches is such that the roller associated with the actuating arms of the switches are disposed in the angular path of travel of the dog 259.

Referring now to FIGS. 12A to 12K, inclusive, and also to FIGS. 13A to 13K, inclusive, a brief summary of the actuation of the various control switches will be given. In FIG. 12A the tool change arm is shown in retracted horizontal position, herein referred to as the parked position. It will also be noted that the grips 61 and 62 are in retracted position within the housing of the arm 56. In this position of the arm 56 and grips 61 and 62, the relative position of the associated related cams are depicted in FIG. 13A. Thus, the cam 249, which relates to the angular position of the arm 56, is angularly located so that the dog 250 is in position to actuate the limit switch 246. The cams 256 and 257, FIG. 13A, are angularly disposed wherein their associated dogs 258 and 259, respectively, are positioned in a horizontal position and not in engagement with an associated switch. When the arm 56 is rotated from the parked position into the ready position depicted in FIG. 12B, the cam 249 is rotated from the position in FIG. 13A to the angular position depicted in FIG. 13B wherein the dog 250 is disposed to actuate the limit switch 247. With the arm 56 rotated to the tool ready position, the cams 256 and 257 will be rotated in the same direction and through the same angle. Thus, the dog 259 associated with the cam 257 is positioned to actuate the limit switch 262. With the arm 56 in the retracted tool ready position, the grips 61 and 62 are moved to extended position into engagement with a tool in the tool ready station and a tool in the spindle. This movement of the grips is effected through the operation of the motor 226 which effects the independent rotation of the inner shaft 227 and also the cams 256 and 257. The cams 256 and 257 are therefore rotated in a clockwise direction from their position in FIG. 13B to the position shown in FIG. 13C. In this position, the dog 259 is angularly disposed to actuate the limit switch 261.

With the grips 61 and 62 in extended position, the arm 56 is next moved to an extended position, FIG. 12D, to effect the withdrawal of a tool from the storage socket of the magazine and the spindle 47. In the diagrammatic views of FIGS. 12A through 12M, the representation is depicted for a first tool change cycle of operation wherein the spindle 47 does not have a tool. Therefore, in the first tool change, the grip 62 will not engage a tool in the spindle. For moving the arm 56 to extended position, the actuator 57 is operated so that the piston 177, FIG. 2, is moved leftwardly. Leftward movement of the piston will effect leftward axial movement of the piston rod or shaft 172 and thereby move the arm 56 to extended position. The dog 243 secured to the shaft 172 will move leftwardly with the shaft 172 into a position to actuate the limit switch 241, depicted in FIG. 13D. The axial rectilinear movement of the arm 56 does not disturb the angular positions of the cams 249, 256 and 257 and they remain in the angularly disposed positions depicted in FIGS. 13C and 13D.

With the arm 56 in the extended position, the motor 226 is operated to move the grips 61 and 62 to the retracted position, depicted in FIG. 12E. This movement of the grips 61 and 62 will also effect rotation of the cams 256 and 257 and they are rotated from the position they occupy in FIG. 13D to the angular position depicted in FIG. 13E. In this position of the cam 257, the associated dog 259 is again disposed to actuate the limit switch 262.

With the arm 56 in the extended position and the grips 61 and 62 retracted, the arm 56 is rotated in a clockwise direction from the position depicted in FIG. 12E into a horizontal extended position depicted in FIG. 12F. This angular movement of the arm 56 will effect a like angular movement of the cams 249, 256 and 257. The cams 249, 256 and 257 will therefore be moved from the position depicted in FIG. 13E into the position depicted in FIG. 13F. In this position, the dog 250 associated with the cam 249 is disposed to actuate the limit switch 246. With the arm 56 in the horizontal extended position, the magazine 48 will be moved so that the storage socket in which the previously used tool removed from the spindle by the grip 62 will be located at the restock station to again receive the tool. This movement of the magazine 48 will be subsequently described in conjunction with the electrical control system.

From the horizontal extended position, the arm 56 is rotated in a clockwise direction into the change position depicted in FIG. 12G. The cams 249, 256 and 257 will also be rotated and move angularly from the position illustrated in FIG. 13F into the position shown in FIG. 13G. With the cams positioned as described, the dog 250 associated with the cam 249 is disposed to actuate the limit switch 248 and the dog 258 associated with the cam 256 is disposed to actuate the limit switch 264.

The grips 61 and 62 are now moved to an extended position depicted in FIG. 12H to axially align the tools carried by the grips with the axes of the storage socket and spindle. This movement of the grips will not affect the cam 249 but will effect angular movement of the cams 256 and 257 and they are moved from the position shown in FIG. 13G into the angular position depicted in FIG. 13H. The dog 258 associated with the cam 256 is therefore positioned to actuate the limit switch 263.

The arm 56 is now retracted so that the tool carried by the grip 62 (if the grip 62 has removed a tool from the spindle) will be inserted in the original storage socket now located at the restock station 54, while the tool withdrawn from the magazine is inserted into the spindle 47 by the grip 61 depicted in FIG. 12I. The retraction of the arm 56 does not effect angular displacement of the cams 249, 256 and 257 which remain in their respective positions, as illustrated in FIG. 13I. However, when the arm 56 is retracted, the dog 243 will be moved rightwardly into the position it occupies in FIGS. 2 and 13I to actuate the limit switch 242.

The grips 61 and 62 are now disengaged from the tools and moved to the retracted position shown in FIG. 12J. This movement of the grips will not rotate the cam 249 but will effect rotation of the cams 256 and 257. The cams 256 and 257 are angularly displaced from the position shown in FIG. 13I to the position depicted in FIG. 13J. In the position illustrated in FIG. 13J, the dog 258 associated with the cam 256 is disposed to actuate the limit switch 264.

The final movement of the arm 56 in a tool change cycle of operation is to return the arm to its horizontal retracted parked position, depicted in FIG. 12K. This final movement of the arm will also effect rotation of the cams 249, 256 and 257. These cams will be rotated from the position shown in FIG. 13J, into the position depicted in FIG. 13K. As a result, the dog 250 associated with the cam 249 will be disposed to actuate the limit switch 246.

The hydraulic circuit for driving the various components described above is illustrated diagrammatically in FIG. 14 and comprises a pump 270 connected to draw hydraulic fluid from a reservoir 271. A motor 273 is operatively connected, in a well-known manner, to operate the pump 270. The output of the pump 270 is discharged into a main hydraulic pressure supply line 277 with the exhaust fluid being carried back to the reservoir by a main return line 278. A pressure relief valve 279 is connected to the main supply line 277 to protect against excess pressure. Selective movement of the magazine 55 in either direction for locating a storage socket at the tool ready station 53 and for locating a storage socket in the restock station 54 is effected by the hydraulic motor 96 which is actuated by hydraulic pressure from the line 277 under the control of a solenoid actuated directional valve 282. The valve 282 is provided with a movable spool 283 which is normally biased into a central position wherein it operates to connect both sides of the motor 96 to a hydraulic pressure branch supply line 284. The valve 282 may be actuated to supply hydraulic pressure to the motor 96 for effecting its operation for driving the magazine 55 in a counterclockwise direction, as viewed in FIG. 9, or to the left, as viewed from the front of the machine in FIG. 1, for locating a storage socket with a tool in the tool ready station 53 by energizing a solenoid 286. Energization of the solenoid 286 will effect a rightward positioning movement of the valve spool 283 which will serve to connect a port of the motor 96 to the hydraulic fluid branch supply line 284 via a valve motor line 287 and a passage 288 formed in the valve spool. With the valve actuated as described, exhaust fluid from the motor 96 will flow through a motor line 289 and a passage 291 in the valve spool and thence through a throttle valve 292 into a connected branch exhaust return line 293. The throttle valve is set to establish the rate at which the motor 96 will rotate in either direction of operation so that the magazine 55 is moved at predetermined rate.

To effect counterclockwise movement of the magazine 55 for locating a selected empty storage socket in the tool restock station 54, the solenoid 286 is deenergized to place the vave in its normal position. A solenoid 294 is energized to effect a leftward positioning movement of the spool 283, which will serve to connect the opposite port of the motor 96 with the hydraulic fluid branch supply line 284 via the valve motor line 289 and a passage 296 formed in the valve spool. In this position of the valve, exhaust fluid from the motor 96 will flow into the valve motor line 287. The exhaust fluid will be directed via the line 287, a passage 297 formed in the valve spool into the branch exhaust line 293. The exhaust fluid will be metered by the throttle valve 292 so that the motor 96 operates to drive the magazine in a counterclockwise direction at a predetermined rate.

Magazine positioning to accurately locate a tool at the tool ready station 53 is accomplished by operation of the shot pin 157. Operation of the shot pin 157 is effected by the hydraulic actuator 160 which is actuated by hydraulic pressure under the control of a solenoid actuated directional valve 300. The valve 300 is provided with a positionable valve spool 301 which is normally biased in a leftward position wherein it operates to connect a branch hydraulic pressure supply line 302 with the left end of the actuator cylinder 161. In this position of the valve, hydraulic pressure is directed from the line 302 through the valve via a passage 303 formed in the valve spool and into a connecting valve motor line 304 to the cylinder. Hydraulic pressure to the left end of the cylinder 161 will maintain the piston 162 in a rightward position thereby maintaining the shot pin 157 in disengaged retracted position. In this position of the valve 300, the exhaust fluid from the right end of the cylinder 161 is directed into a motor line 306 and flows through the line into the valve 300. A passage 307 formed in the leftwardly positioned valve spool directs the exhaust fluid into a connected branch exhaust return line 308.

For moving the shot pin 157 into magazine engagement, the valve 300 may be actuated to supply hydraulic pressure to the right end of the cylinder 161 for effecting a leftward movement of the piston 162 to move the shot pin 157 into magazine engagement by energizing a solenoid 311. Energization of the solenoid 311 will effect a rightward positioning movement of the spool 301. The spool 301 when in a rightward position will operate to connect the branch hydraulic pressure line 302 to the motor line 306 via a passage 312 formed in the spool 301. In this position of the valve spool, the exhaust fluid from the left end of the cylinder 161 will be returned to the reservoir 271 via the motor line 304, a passage 313 formed in the valve spool, the branch exhaust return line 308 and the main exhaust return line 278.

Movement of the tool change arm 56 to an extended or retracted position is effected by the hydraulic actuator 57 which is actuated by hydraulic pressure obtained from a branch supply line 314 under the control of a solenoid actuated directional valve 315. The valve 315 is provided with a movable spool 316 which is normally biased into a central position wherein it operates to connect both ends of the actuator cylinder 171 to the branch pressure supply line 314. In FIG. 14, the arm 56 is diagrammatically illustrated as being in a horizontal retracted parked position. The arm may be moved to an extended position by supplying hydraulic pressure to the right end of the cylinder 171. To this end, the valve 315 is actuated by energizing a solenoid 317 which operates to move the valve spool 316 into a leftward position. With the spool 316 in a leftward position, a passage 318 is disposed to connect the branch supply line 314 with a valve motor line 319 for directing hydraulic pressure to the right end of the cylinder 171, thereby moving the arm 56 to an extended position. With the valve actuated as described, exhaust fluid from the left end of the cylinder flows through a connected valve motor line 321 and the valve 315 via a passage 322 and thence through a throttle valve 323 which establishes the rate at which the arm 56 will be moved. The exhaust fluid then continues through a branch exhaust fluid return line 324 to the main exhaust fluid return line 278.

Movement of the tool change arm 56 to the retracted position is accomplished by deenergizing the solenoid 317 and energizing a solenoid 326 associated with the valve. With the solenoid 317 deenergized, the valve spool will be spring biased to its central position. However, with the solenoid 326 energized, the valve spool will be moved from its central position into a rightward position. In this position of the spool, it will operate to direct hydraulic pressure to the left end of the cylinder 171 by connecting the branch supply line 314 to the valve motor line 321 via a passage 327 formed in the spool. Exhaust fluid from the right end of the cylinder is directed into the exhaust return line 324 via the valve motor line 319, a passage 328, and the throttle valve 323.

Rotation of the tool change arm 56 in a counterclockwise direction from the parked position depicted in FIG. 12A to the ready position shown in FIG. 12B, or from the tool change position illustrated in FIG. 12J to the parked position depicted in FIG. 12K, is effected by the operation of the hydraulic motor 185 under the control of a solenoid actuated directional valve 330. Energization of a solenoid 331 will effect the movement of a valve spool 332 which is normally biased to a central neutral position into a leftward position. In its leftward position, the valve spool operates to direct hydraulic pressure from a branch supply line 333 to a valve motor line 334 by means of a passage 336. The hydraulic pressure directed into the line 334 will flow therethrough to the motor to effect its operation in a direction to rotate the arm 56 in a counterclockwise direction. With the valve spool in its leftward position, exhaust fluid from the motor will flow through a connected valve motor line 337, a passage 338 in the valve spool to and through a throttle valve 339, which is set to control the rate at which the arm 56 is rotated. From the throttle valve 339, the exhaust fluid flows through a branch exhaust return line 341 which is connected to the throttle valve and the main return line 278.

Rotation of the arm 56 in a clockwise direction from the ready position depicted in FIG. 12E to the tool interchange position depicted in FIG. 12G, is accomplished by deenergizing the solenoid 331 which allows the spool to be biased to its central position. A solenoid 343 associated with the valve 330 may then be energized to effect the movement of the valve spool from its central position into a rightward position. With the valve spool disposed in its rightward position, it operates to connect the supply line 333 with the valve motor line 337 by means of a passage 344 formed in the spool. Hydraulic pressure directed into the line 337 will flow therethrough to the motor 185 to effect its operation in a direction to rotate the arm 56 in a clockwise direction. Exhaust fluid from the motor 185 will flow into the line 334 and will flow through the valve via a now aligned connecting passage 346 into the throttle valve 339. From the throttle valve 339, the exhaust fluid flows into the branch exhaust line 341 and thence is returned to the reservoir 271 via the main exhaust return line 278. As previously described, the extension and retraction of the grips 61 and 62 is effected by the hydraulic motor 226 which is under the control of a solenoid actuated directional valve 350. Energization of a solenoid 351 will actuate the valve 350 to move a valve spool 352 therein from its leftward position into a rightward position. With the valve spool 352 in a rightward position, hydraulic pressure from a branch supply line 353 is directed to the motor 226 via a passage 354 formed in the spool and a valve motor line 356. The hydraulic pressure supplied to the motor 226 through the rightwardly positioned valve spool will effect its operation in a direction to move the grips 61 and 62 to an extended position. The exhaust fluid from the motor 226 will flow through a connected line 355, a passage 357 in the valve spool to and through a throttle valve 358. The throttle valve operates to control the rate at which the grips are extended and retracted. From the throttle valve 358, the exhaust fluid flows through a connected branch return line 349 into the main return line 278 to return to the reservoir.

Retraction of the grips is accomplished by deenergizing the solenoid 351 and energizing a solenoid 359 which will move the valve spool 352 to its leftward position. In a leftward position, the valve spool 352 is operative to direct hydraulic pressure from the supply line 353 to the motor 226 via a passage 361 formed in the spool and the line 355. The hydraulic pressure supplied to the motor 226 via the leftwardly positioned valve spool effects the operation of the motor in a direction to retract the grips 61 and 62. With the valve actuated as described, exhaust fluid from the motor is returned to the reservoir via the line 356, a passage 362 in the valve spool, the throttle valve 358, the branch return line 349 and the main return line 278.

The electrical circuit for controlling the operation of the machine tool is shown diagrammatically in FIGS. 15 and 15A. Certain conditions will be assumed in describing the operation of the electrical circuit to best illustrate the various features of the circuit. It will be assumed that a new set of tools has been placed in the storage magazine 55 for the next machining cycle, and that the first tool of the set to be used is the tool 50 which is stored in the socket 105A located at the ready station 53, as shown in FIGS. 1 and 9. It will also be assumed that the tool 50D stored in the storage socket 105H is the last tool of the set to be used. It will noted that the set of tools includes at least two large diameter tools 50B and 50C which are stored in sockets 105D and 105F, respectively. A large tool is defined as a tool having a diameter that is greater than the distance between the axes of two adjacent storage sockets. In other words, a large tool is any tool which when stored in a particular socket, would interfere with the removal or insertion of the tools stored in adjacent sockets. Thus, when a set of tools includes large tools, the sockets adjacent to the sockets in which the large tools are stored must be left empty. In FIG. 9, a large tool 50B is stored in a storage socket 105D and the adjacent storage sockets 105C and 105E are left empty. Also, the large tool 50C is stored in the socket 105F and the adjacent sockets 105E and 105G are left empty. It is to be assumed that the tool 50 is the first tool in the first set of tools, while the tool 50D is the last tool of the first set of tools to be used. Therefore, the tool 50E in the storage socket 105I will be the first tool of a second set of tools, while the tool 50Z in the storage socket 105DD is the last tool in the second set of tools. It will be further assumed that the spindle 47 does not contain a tool and that the power to the machine is turned off. The tool change arm 56 is in a horizontal retracted parked position. Each of the electrical components is shown in the wiring diagrams as connected across the power lines in one of the plurality of conductors or lines that are connected across the power lines with each of these lines being identified successively by the numerals L1 to L82, inclusive, so that the components may be readily located. The contact bars of the various relays are identified by the same reference numerals as their associated relay coils with a latter suffix added for the purpose of distinguishing each individual contact bar from the other. Some of the relays have a coil appearing in one figure and one or more of its contacts appearing in the other figure. In such cases, the relay coil is depicted in solid lines in its appropriate location in the circuit and is again shown in broken lines, disconnected from the wiring circuit in the other figure which contains some of its contacts. With this arrangement, it may be immediately ascertained that such contacts are actuated by a relay coil which is connected in a portion of the circuit shown in the other figure.

Power for operating the machine is obtained from a three phase source represented by the lines S1, S2 and S3 in FIG. 15A, which are connectible to energize the spindle motor 49 and the pump motor 273 through a master switch 370 and through normally open contact bars 371M of a starter relay 371. The control circuit is energized by single phase current obtained from a transformer 372 which has its primary coil connected to the lines S1 and S2 with its secondary coil being connected to supply power of desired voltage to energize vertical power lines 373 and 374.

To energize the control circuit and the motors 49 and 273, a start switch 380, FIG. 15A, line L75, is momentarily depressed, thereby completing a circuit from a conductor 381 to the vertical conductor 373, through a normally closed contact bar of a stop pushbutton switch 382, and then through the coil of the motor starter relay 371 to the energized control conductor 374. Energization of the starter relay 371 moves the six contact bars 371M upwardly completing circuits to energize the spindle motor 49 and the pump motor 273. Another contact bar 371A, line L76, is simultaneously moved to an upward closed position to complete a maintaining circuit between the vertical conductor 373 and the conductor 381 to retain the relay 371 and the control conductors 373 and 374 energized.

In a tool change cycle, signals for initiating certain functions are obtained from a record such as magnetic tape 383 which is read by a tape reader 384 shown diagrammatically in line L4 of FIG. 15. Depressing a normally open pushbutton switch 386, in line L1, will complete a circuit from the energized vertical conductor 373 through a normally closed automatic contact bar 387, through the bridging contact bar of the switch 386, the coil of a tape relay 388 and thence to the energized vertical conductor 374. With the relay 388 energized, it will operate to move its normally open contact bar 388A, in line L4, to a closed position thereby connecting the tape reader 384 in the circuit. With the tape reader 384 connected in the circuit, it will function to produce the appropriate signals in response to information contained on the tape for the required functions necessary in a tool change cycle of operation. Another contact bar 388B of the energized relay 388 is also moved to a closed position to thereby establish a maintaining circuit around the pushbutton switch 386 to retain the coil of the tape relay 388 energized.

A tool change cycle of operation is initiated by the operator depressing a tool change cycle start pushbutton switch 390 in line L5. With the pushbutton switch 390 momentarily depressed, the coil of a cycle start relay 391 is energized. Energization of the relay 391 causes the closing of an associated contact 391A to establish a maintaining circuit for retaining the coil of the relay energized upon the release of the pushbutton switch 390. Simultaneously, with the closing of the contact 391A, another normally open contact 391B is also moved to closed position. The storage socket 105A, containing the first tool of the first set of tools, is located in the ready station 53, depicted in FIGS. 9 and 11, and the tool sensing limit switch 143, line L10, is actuated and its contact bar is moved from the normally open position to a closed position. Thus, with the contact bar 391B in closed position, a circuit is completed along line L10 to energize the coil of a shot pin engaged relay 393. With the coil of the relay 393 energized, the relay will be actuated to move an associated contact 393A, in line L14, to a closed position. This will establish a maintaining circuit around the limit switch 143 to retain the coil of the relay 393 energized upon the subsequent withdrawal of the first tool 50 from its storage socket, which will effect the release of the switch 143. Simultaneously, a normally closed contact 393B, in line L6, is moved to open position to thereby maintain the coil of the magazine clockwise rotation relay 392 deenergized. On the other hand, a normally open contact 393C, in line L73, FIG. 15A, is moved to a closed position to complete a circuit to energize the solenoid 311 associated with the directional valve 300. With the solenoid 311 energized, the valve 300 will be operated, as previously described, to direct hydraulic pressure to the right end of the cylinder 161 thereby moving the shot pin 157 into magazine engagement. This will insure that the socket 105A in which the first tool 50 is stored, is accurately positioned at the ready station 53 so that the grip 61, upon subsequent rotation of the arm 56, will engage the tool 50.

With the first tool 50 located at the ready station 53, a tool change cycle of operation is initiated, either manually by the operator depressing a pushbutton switch 396, line L21, or automatically by the closing of an automatic contact 397, in line L22, which is actuated by a signal obtained from the tape reader 384. In either mode, a circuit will be completed along the conductor of line L22, through a now closed contact bar 393D, through the coil of a tool change cycle relay 398, to the energized power line 374. Energization of the coil of the relay 398 will actuate the relay so that it operates to move its normally open contacts 398A, 398B, 398C and 398D in lines L20, L19, L15 and L63, respectively, to closed positions. The movement of the contact 398A to a closed position completes a maintaining circuit along line L20 to line L22 to retain the coil of the relay 398 energized. The contact 398B, when moved to closed position, completes a circuit along line L19 and through a normally closed automatic end of program contact 399, a normally closed contact of a pushbutton switch 401, to the now closed contact bar 393E. The circuit continues from the contact bar 393E, through the now closed contact bar 398B and thence through the coil of an initial tool relay 402, with the circuit being completed along line L16 to the energized conductor 374. The initial tool relay 402 is retained energized until the end of program automatic contact 399 is actuated. This is accomplished by a maintaining circuit established from lines L19 and L20 through the now closed contact bar 402B to line L17 and thence to the coil of the relay.

Actuation of the relay 398 initiates the operation of the tool change arm 56 in a tool interchange cycle of operation. This is accomplished when the contact bar 398D, in line L63, is moved to a closed position. With the contact bar 398D in a closed position, a circuit is completed from the energized vertical conductor 373 along line L63, through the now closed contact bar 398D to line L61 and thence to a first contact 406 of twelve contacts 406 to 417, inclusive, of one bank 418 of contacts of a stepping switch generally identified by the reference numeral 420 and thence to a wiper arm 421. With the wiper arm of the stepping switch 420 respectively engaging a first contact of respective banks of contacts, circuits are completed therethrough, as shown in FIG. 15. As is well-known in the art, the respective wiper arms associated with each bank of contacts of the stepping switch are simultaneously advanced to sequentially dispose contacts of each bank, as will hereinafter be explained. In the present instance, a wiper arm 421 associated with the stepping switch bank 418 is in an initial position in which it is in engagement with the first contact 406 thereof. A wiper arm 422, associated with a bank of contacts 425 of the stepping switch 420 is likewise in an initial position wherein the wiper arm 422 is in engagement with the first contact 426 of the bank of contacts 425 of the stepping switch 420. However, the contact 426 is not connected into the circuit and is always dead. From the wiper arm 421, the circuit is completed via a conductor 441, through a normally closed contact bar 442A of a deenergized stepping switch relay 442, through the coil of the relay 442 to the energized conductor 374. Energization of the stepping switch relay 442 moves its associated contact bar 442A upwardly interrupting the circuit to the coil of the relay thereby deenergizing the relay. Upon deenergization, the stepping switch relay coil wiper arms 421 and 422 of the stepping switch 420 are advanced counterclockwise, as viewed in FIG. 15, to the second contacts 407 and 427 of the banks 418 and 425, respectively. This stepping movement is effected in well-known manner by operation of a spring returned ratchet and pawl mechanism 443, which is schematically depicted in FIG. 15.

Upon advancement of the wiper arms 421 and 422 to the second contacts 407 and 427, respectively, of each bank of contacts, the circuit previously established through the wiper arm 421 to the coil of the relay 442 is interrupted. This prevents the immediate reenergization of the relay and further stepping operation of the stepping switch 420 upon the return of the contact bar 442A to its normally closed position.

With the wiper arm 422 positioned in engagement with its second contact 427, a circuit is established from the energized conductor 373, along line L64, through the wiper arm 422 to the contact 427. From the contact 427, the circuit continues along a vertical conductor 444 to line L47 and thence through the coil of an arm counterclockwise relay 445, the coil being connected to the energized conductor 374. Energization of the relay 445 moves its associated contact bar 445A, line L69, FIG. 15A, upwardly completing a circuit along line L69 to energize the solenoid 331 associated with the valve 330.

With the solenoid 331 energized, the valve 330 is operated, as previously described, to direct hydraulic pressure to the arm motor 185 to effect rotation of the arm 56 in a counterclockwise direction from its horizontal retracted parked position, in FIG. 12A, to a retracted tool ready position depicted in FIG. 12B. With the tool change arm 56 in the retracted tool ready position, the limit switch 247 is actuated, as depicted in FIG. 13B. In line L62 of FIG. 15, the limit switch 247 is shown in its normal open position. Thus, with the limit switch 247 actuated to a closed position, a circuit is completed from the energized conductor 373 along line L62, through the now closed contact bar of the limit switch 247, to the second contact 407 of the bank of contacts 418. The circuit continues from the contact 407, through the wiper arm 421, the conductor 441, contact bar 442A, through the coil of the relay 442, and thence to the energized conductor 374. Energization of the coil of the relay 442 effects the actuation of the relay wherein the contact bar 442A is moved to open position. This will effect deenergization of the relay 442 and the resulting advancement of the wiper arms 421 and 422, as previously described. The wiper arms 421 and 422 are therefore moved into positions in which they engage the contacts 408 and 428, respectively, of the bank of contacts 418 and 425, respectively.

With the tool change arm 56 in retracted ready position, depicted in FIG. 12B, the grips 61 and 62 must be extended so that the grip 61 engages the tool 50 located at the ready station 53; the grip 62 will also be moved outwardly, and if the spindle 47 has a tool, the grip will engage this tool. However, since this present cycle is the start of a machining operation, the spindle 47 does not have a tool in this particular instance and the grip 62 will not engage on a tool. Extension of the grips 61 and 62 is effected by the advancing movement of the wiper arm 422 into engagement with the contact 408 of the bank of contacts 425.

With the wiper arm 422 engaging its associated third contact 428, a circuit is established from the energized conductor 373 along line L64 and through the wiper arm 422 to the contact 428. The circuit continues from the contact 428, through a connecting conductor 446 to line L54 and thence through the coil of a grip out relay 447, which is connected to the energized vertical conductor 374. With the coil of the relay 447 energized, the relay is operated and will move its normally open contact bar 447A, in line L68 of FIG. 15A, to a closed position. This will complete a circuit along line L68 to energize the solenoid 351 associated with the valve 350. The valve 350 will be operated, as previously described, to direct hydraulic pressure to the motor 226 for effecting its operation to move the grips 61 and 62 to the extended position and the limit switch 261 will be actuated, as depicted in FIG. 13C.

The contact bar of the actuated limit switch 261, in line L50, will be moved to a closed position and a circuit will be completed from the energized conductor 373, via line L50, FIG. 15, through the now closed contact bar of the actuated limit switch 261 and thence to the third contact 408 of the bank of contacts 418. From the contact 408, the circuit continues through the wiper arm 421 and thence through the balance of the circuit to effect actuation and deactuation of the relay 442 to step the wiper arms 421 and 422, as previously described. This stepping advancement of the wiper arms 421 and 422 moves them into engagement with their associated fourth contacts 409 and 429, respectively.

With the wiper arm 422 positioned in engagement with the contact 429, a circuit is established from the energized conductor 373 to the contact 429 via line L64 and the wiper arm 422. The circuit continues from the contact 429 along a connected conductor 448 to and through the coil of an arm out relay 449, which is connected to the energized conductor 374. With the coil of the relay 449 energized, the relay will be actuated and will operate to move its associated contact bar 449A, in line L66 of FIG. 15A, to a closed position. A circuit is now completed along the line L66 to energize the solenoid 317 associated with the valve 315. The valve 315 is operated, as previously described, to direct hydraulic pressure to the right end of the cylinder 171 to effect outward extending movement of the tool change arm 56. As the arm 56 starts to move outwardly away from the face of the column 30, the plunger 220 will be urged rightwardly, as viewed in FIGS. 4 and 6, to effect the clamping of the grips.

Movement of the arm 56 to an extended outward position will withdraw the tool 50 from the storage socket 105A and when the arm 56 is fully extended, the limit switch 241 will be actuated, as depicted in FIG. 13D. The limit switch 241 has a pair of contacts 241A and 241B, which are shown in lines L44 and L51, respectively, and these contacts are illustrated in open position, which is the normal position when the switch is deactuated or released. Thus, with the switch 241 actuated, the normally open contacts 241A and 241B are moved to a closed position. The closing of the contact 241A has no effect on the control circuit at this time. However, with the contact 241B in closed position, it operates to complete a circuit to the contact 409 of the bank of contacts 418. Since the wiper arm 421 is positioned in engagement with the contact 409, the relay 442 is energized and immediately deenergized, as previously described, to thereby advance the wiper arms 421 and 422 into engagement with their associated next contacts 410 and 430, respectively.

The next function to be accomplished in the tool change cycle of operation is to retract the grips 61 and 62 so that the tools secured thereto (presently only the tool 50 in the grip 61) are moved to a position depicted in FIG. 12E, in which they may be moved in an arcuate path without interference from other tools projecting from the magazine. This retracting movement of the grips 61 and 62 is effected when the wiper arm 422 is moved into engagement with the fifth contact 430 of the bank of contacts 425. With the wiper arm 422 in engagement with the contact 430, a circuit is completed from the vertical energized conductor 373 to the contact, as previously described. The circuit continues from the contact 430 through a connected conductor 451 to line L49 and thence through the coil of a grip in relay 452 which is connected to the energized conductor 374. The energized relay 452 operates to move its associated normally open contact bar 452A, in line L65, FIG. 15A, to a closed position. This completes a circuit along line L65 to energize the solenoid 359 associated with the valve 350. The solenoid 351 associated with the valve 350 is presently deenergized, which was accomplished when the wiper arm advanced from the contact 428 to the contact 429 previously described. With the solenoid 359 energized, the valve 350 will be operated, as previously described, to effect the operation of the motor 226 for moving the grips 61 and 62 inwardly to a retracted position, depicted in FIG. 12E. With the grips retracted, the limit switch 262, depicted in FIG. 13E, is actuated.

The next step in the tool change cycle is to rotate the tool change arm 56 clockwise, as indicated by the arrows in FIG. 12E, from its extended ready position to an extended horizontal position, depicted in FIG. 12F. This move is initiated as soon as the limit switch 262 is actuated, as mentioned above. The limit switch 262 is depicted in line L52 of FIG. 15 in its normal deactuated position. Therfore, with the limit switch 262 actuated, its contact bar is moved to a closed position thereby completing a circuit from the energized conductor 373 to the contact 410 and thence through the wiper arm 421 to the coil of the stepping switch relay 442. This will energize the coil of the relay 442 which operates in the manner previously described, to effect the advancing movement of the wiper arms 421 and 422, into engagement with contacts 411 and 431 respectively. When the wiper arm 422 is moved out of engagement with the contact 430, the circuit to the coil of the relay 452 is interrupted, which will effect the deenergization of the solenoid 359 of the valve 350.

With the wiper arm 422 in engagement with the contact 431, a circuit is completed from the wiper arm through the contact, through a connected conductor 453, through a normally closed contact bar 246B of the deactuated limit switch 246, to the coil of an arm clockwise rotation relay 454, to energize the relay. The energized relay 454 operates to move its associated normally open contact bar 454A, in line L67 of FIG. 15A, to a closed position This completes a circuit along the line L67 to energize the solenoid 343 associated with the valve 330. The valve is operated to direct hydraulic pressure to the motor 185, as previously described, to effect the operation of the motor for rotating the arm 56 from its position, depicted in FIG. 12E, to the position depicted in FIG. 12F. When the arm 56 is in the extended horizontal position, depicted in FIG. 12F, the limit switch 246 is actuated, as depicted in FIG. 13F. In FIG. 15, the limit switch is illustrated in its normal deactuated position, and as therein depicted, the limit switch 246 is provided with two normally open contact bars 246A and 246B, in lines L44 and L59, and a normally closed contact bar 246C, in line L52. The movement of the contact bars 246A and 246B of the switch 246 to closed positions have no effect on the control circuit at this time. However, the movement of the contact bar 246C of the switch 246 to an open position operates to interrupt the circuit along line L52 to effect the deenergization of the arm clockwise rotation relay 454. With the relay 454 deenergized, its associated contact bar 454A, in line L67 of FIG. 15A, is moved to its normal open position thereby effecting the deenergization of the solenoid 343 associated with the valve 330. The valve plunger 332 is thereby biased to its central position for stopping the operation of the motor 185. The arm 56 will now be stopped in the extended horizontal position, depicted in FIG. 12F.

The tool change arm 56 will normally be maintained in the extended horizontal position until the magazine 55 has moved in a counterclockwise direction, as viewed in FIG. 9, to position an empty socket in the restock station 54 for receiving the tool held by the grip 62 which was withdrawn from the spindle. However, the tool change cycle being described is the first cycle in which the initial or first tool of a set of tools is being transferred. It will be recalled that the initial tool 50 was inserted in the storage socket 105A which was located at the tool ready station 53. It was therefore not necessary for the magazine to index to locate this tool at the station 53. Also, since the spindle 47 does not have a tool, it is not necessary that the magazine move in a counterclockwise direction for locating a socket at the restock station 54. As a result of this non-movement of the magazine, the socket sensing or counting switch 137 is not actuated. In FIG. 15, line L41, the limit switch 137 is depicted in its normally open position. As shown in FIG. 15, lines L37, L39 and L41, there are provded three counters 461, 462 and 463, which are all associated and connectible in the circuit with the socket counting limit switch 137 at selected times. The counter 461 is connected in series with the switch 137 only when the magazine 55 is rotated in the reverse or counterclockwise direction for locating an original storage socket in position at the restock station 54 to receive a previous used tool removed from the spindle and which was originally stored in the particular socket. The counter 463 is connected in series with the switch 137 only when the magazine 55 is to be moved in a clockwise direction, as viewed in FIG. 9, to locate a succeeding tool in the tool ready station 53. On the other hand, the counter 462, identified as the Minus 1 Counter is connected in series with the switch 137 after the first tool change cycle and serves as a memory. The counters 461 and 462 are commercially available units of the type that count upon every input pulse. In other words, if either the counter 461 or counter 463 is connected in series with switch 137, every time the switch closes and opens, an input pulse is transmitted to one or the other of these counters. For every input pulse to the counters 461 and 463, an output signal will be delivered to either a comparator 464 or 466. The counter 462 is of a type in which the first input pulse is counted as a "zero," while the second input pulse is counted as "one," the third input pulse will be counted as "two," etc. Therefore, a signal input from the counter 462 to the comparators 464 and 466 will not be obtained upon a single actuation of the switch 137.

As previously mentioned, the socket sensing switch 137 is not actuated at this time. As a result, no signals will be transmitted from the counters 461 and 462 to the comparator 464. Therefore, coincidence between the two inputs to the comparator 464 is obtained. The comparator 464 now operates to transmit an energizing current to the coil of a magazine counterclockwise satisfied relay 467 to energize the relay. The energized relay 467 operates to move four normally open contact bars 467A, 467B, 467C and 467D, in lies L14, L29, L43 and L48, respectively, to closed positions. Movement of the contact bars 467A, 467B and 467C to closed positions has no effect on the control system at this time. However, when the contact bar 467D is moved to a closed position, it operates to complete a circuit from the energized conductor 373 along line L48 through the now closed contact bar 467D to line L53. The circuit continues along line L53 and thence to the contact 411 of the bank of contacts 418. At this time, the wiper arm 421 is positioned in engagement with the contact 411, as previously described, so that a circuit for energizing the coil of the stepping switch relay 442 is established. The energized relay 442 operates to effect a stepping movement of the wiper arms 421 and 422 wherein they are moved into engagement with contacts 412 and 432, respectively.

With the wiper arm 422 positioned in engagement with the associated contact 432 of the bank of contacts 425, a circuit is completed from the wiper arm to the contact 432 and thence through a coinductor 468 to line L52 and thence to the coil of the arm clockwise rotation relay 454. The relay 454 will operate to again move its associated contact bar 454A, in line L67, FIG. 15A, to a closed position. The solenoid 343 associated with the valve 330 is again energized and the motor 185 will operate to continue the clockwise movement of the arm 56. Thus, the arm 56 will be moved in a clockwise direction, as indicated by the arrows in FIG. 12F, to the tool change position depicted in FIG. 12G, wherein the grip 61, carrying the initial tool 50, is positioned adjacent the spindle 47.

With the tool change arm 56 in the tool change position, the limit switch 248, depicted in FIG. 13G, will be actuated. The limit switch 248 is shown in line L55 of FIG. 15 in its normal position and therefore, when it is actuated, its associated contact bar will be moved to a closed position. This completes a circuit along line L55 to the contact 412 of the bank of contacts 418 and thence through the wiper arm 421 and the connecting circuitry to energize and actuate the stepping switch relay 442, as previously described. The wiper arms 421 and 422 are again advanced so that they are moved into engagement with the contacts 413 and 433, respectively.

This movement of the wiper arm 422 will effect the outward extending movement of the grips 61 and 62 so that the tool 50, carried by the grip 61, is positioned in axial alignment with the spindle 47. If the grip 62 had removed a tool from the spindle, that tool would be positioned so that its axis would coincide with the axis of the storage socket at the restock station 54. The movement of the grips 61 and 62 to an extended position is accomplished by energizing the grip out relay 447, as previously described. The relay 447 is energized, in this instance, through a circuit completed from the wiper arm 422 through the contact 433 to a connected conductor 469. The conductor 469 is joined with the conductor 446, on line L54, so that the circuit continues along line L54 to the coil of the relay 447. With the relay 447 energized, the solenoid 351 will be energized. The valve 350 will now be actuated to effect the operation of the motor 226 to move the grips 61 and 62 to an extended position.

This step in the tool change cycle of operation locates the tools carried by the grips in position for insertion in the spindle 47 and a storage socket located at the restock station 54. To effect the insertion of the tools, the arm 56 must be moved inwardly towards the face of the column 30 to a retracted position. This inward or retracting movement of the arm 56 is effected by operation of the limit switch 263, depicted in FIG. 13H, which is actuated when the grips 61 and 62 are moved to their limit of outward travel. In FIG. 15, the limit switch 263 is depicted in its normal deactuated position. Therefore, with the switch 263 actuated, its contact bar is moved to a closed position thereby completing a circuit along line L56 to the contact 413 of the bank of contacts 418. From the contact 413, the circuit continues through the wiper arm 421 and the balance of the connecting circuitry to effect energization of the stepping switch relay 442, as previously described. The relay 442 operates to effect the stepping movement of the wiper arms 421 and 422 to position them in engagement with contacts 414 and 434, respectively.

With the wiper arm 422 positioned in engagement with its associated contact 434, a circuit is established from the energized wiper arm 422 to the contact 434 and thence through a connecting conductor 471 to the coil of an arm in relay 472, which is connected to the energized conductor 374. Energization of the relay 472 effects its operation so that it operates to effect the movement of the tool change arm 56 to an inward retracted position. In this movement of the arm, the tool 50, carried by the grip 61, is inserted into the spindle. With the arm 56 in the retracted position, depicted in FIG. 12G, the rods 220 associated with the grip locking cams 208 and 208A are moved inwardly or leftwardly, as viewed in FIG. 6, to the position depicted in FIG. 4, thereby effecting the unclamping of the grips.

With the arm 56 in retracted position and the grips 61 and 62 unclamped, the grips must be retracted prior to the arm 56 being rotated to its parked position. The retraction of the grips 61 and 62 is initiated through the actuation of the limit switch 242, which is accomplished when the arm 56 has been moved to its full retracted position, shown in FIGS. 12I and 13I. In FIG. 15, line L57, the limit switch 242 is depicted in its normal deactuated position. Therefore, with the switch actuated, its contact bar is moved to a closed position thereby completing a circuit along line L57 to the contact 414 of the bank of contacts 418. The wiper arm 421 is presently positioned in engagement with the contact 414 and, therefore, the circuit continues on through the wiper arm and the balance of the previously described circuitry to effect the operation of the stepping switch relay 442. The operation of the relay 442 effects the stepping advance of the wiper arms 421 and 422 wherein they are moved into engagement with the contacts 415 and 435, respectively.

With the wiper arm 422 in engagement with the contact 435, a circuit is completed from the contact 435, through a connected conductor 473 and thence through the conductor 451 to the coil of the grip in relay 452 to energize the relay. The energized relay 452 operates, a previously described, to effect the energization of the solenoid 359 associated with the valve 350 which, in turn, effects the operation of the motor 226 in a manner to move the grips 61 and 62 inwardly within the arm housing 179, leaving the tool 50 in the spindle 47. The tool change arm 56 may now be rotated into the retracted horizontal parked position.

With the grips 61 and 62 moved to their retracted positions, depicted in FIG. 12J, the limit switch 264, depicted in FIG. 13J, will be actuated. In FIG. 15, line L58, the limit switch 264 is depicted in its normal open position. Therefore, with the limit switch 264 actuated, its contact bar will be moved to a closed position, thereby completing a circuit along line L58 to the wiper arm 421 and thence through the balance of the circuitry previously described, to effect the energization and immediate deenergization of the stepping switch relay 442. The operation of the relay 442 effects a single step advancement of the wiper arms 421 and 422 to position them in engagement with the contacts 416 and 436, respectively, of the bank of contacts 418 and 425, respectively.

Movement of the wiper arm 422 into engagement with the associated contact 436, operates to complete a circuit from the energized wiper arm 422 to the contact 436 and thence along a connected conductor 474 to the coil of the arm counterclockwise rotation relay 445, to energize the relay coil. The energized relay 445 operates to move the associated normally open contact bar 445A, in line L69 of FIG. 15A, to a closed position thereby completing the circuit for energizing the solenoid 331 associated with the valve 330. Energization of the solenoid 331 effects the operation of the valve 330 to direct hydraulic pressure to the motor 185, as previously described, to rotate the arm 56 in a counterclockwise direction from the position depicted in FIG. 12J to the parked position depicted in FIG. 12K.

With the tool change arm 56 returned to the parked position, the limit switch 246 will be actuated, as depicted in FIG. 13K. In FIG. 15, line L59, the limit switch 246 is depicted in its normal deactuated position. Therefore when actuated, its associated normally open contact bars 246A and 246B, in lines L44 and L59, are moved to closed positions, while the normally closed contact bar 246C, in line L52, will be moved to an open position. The movement of the contact bars 246A and 246C to closed and open positions, respectively, have no effect on the control system at this time. However, with the contact bar 246B in a closed position, a circuit is completed to effect energization of the steping switch relay 442 and the relay 442 is immediately deenergized, as previously described, to effect the stepping advance movement of the wiper arms 421 and 422 into engagement with contacts 417 and 437, respectively, of the bank of contacts 418 and 425, respectively. As soon as the wiper arm 422 moves off of the contact 436 it interrupts the circuit that had been established therethrough for energizing the arm counterclockwise rotation relay 445. Thus, the relay is deenergized which results in the valve spool 332 of the valve 330 being biased to the central position depicted in FIG. 14. This stops the operation of the motor 185 and thereby the rotation of the arm 56 and the arm is maintained in its retracted horizontal parked position.

The spindle 47 with the tool 50 is now operated to perform a work operation. While the spindle is performing a work operation, the magazine 55 is moved in a clockwise direction, as viewed in FIG. 9, to position the next succeeding tool 50A in the tool ready station 53. At this point, it will be well to summarize the condition of the various relays.

The cycle start relay 391, line L5, FIG. 15, is energized, and as a result, the associated contact bars 391A, 391B and 391C, in lines L7, L10 and L34, respectively, are in closed positions. The initial tool relay 402 is energized and it is maintained energized throughout the entire work operation program. Therefore, the associated contact bars 402A, 402B, 402C, 402D and 402E, in lines L15, L18, L25, L41 and L47, are in closed positions. The shot pin engaged relay 393 is retained energized at this time through a maintaining circuit completed along line L14, through the now closed contact bar 393A, the normally closed contact bar 480A of a deenergized magazine counterclockwise rotation relay 480. The maintaining circuit continues to line L13 and thence to line L10 and through the now closed contact bar 391B of the energized cycle start relay 391 through the normally closed contact bar 481A of a deenergized tool change complete relay 481 to the coil of the relay 393. With the shot pin engaged relay 393 maintained energized, its associated normally open contact bars 393A, 393C, 393D and 393E are all in closed positions, while the normally closed contact bars 393B and 393F, associated with the relay 393, are both in open positions. With the contact bar 393B, line L34, in open position, the magazine clockwise rotation relay 392 is deenergized. The tool change relay 398 is retained energized at this time through a maintaining circuit established along line L20 through a normally closed contact bar 482B of a deenergized magazine movement complete relay 482, the coil appearing in line L30. The circuit for retaining the relay 398 energized continues along line L20, through the now closed contact bar 398A and thence along line L20, and by means of a connecting conductor 483 to line L22. The maintaining circuit continues along line L22 and through a now closed contact bar 393D of the energized shot pin engaged relay 393, to the coil of the tool change relay 398.

The recapitulation of the condition of the various relays in the control system given above exists just prior to the movement of the wiper arm 422 into engagement with the contact 437 of the bank of contacts 425. Therefore, when the wiper arm 422 moves into engagement with the contact 437, a circuit will be completed from the energized conductor 373, along line L64, through the wiper arm 422 to the contact 437. The circuit continues from the contact 437, through a connecting conductor 484 to the now closed contact bar 402E of the energized initial tool relay 402. The circuit continues from the contact bar 402E to line L46 and thence to the coil of a tool change complete relay 481 which is connected to the energized conductor 374. The energized relay 481 will operate to move its associated normally closed contact bar 481A, in line L10, to an open position, and simultaneously therewith, move two normally open contact bars 481B and 481C, in lines L28 and L29 respectively, to closed positions.

With the energization of the tool change complete relay 481, movement of the magazine 55 to locate the next succeeding tool 50A at the ready station 53 will be initiated. This is accomplished because with the relay 481 energized, its associated contact bar 481A, in line L10, is moved to an open position. As a result, the shot pin engaged relay 393 is deenergized and its associated contact bar 393C, in line L73, is released to its normal open position thereby deenergizing the solenoid 311 associated with the valve 300. With the solenoid 311 deenergized, the valve spool 301 is biased into its leftward position, depicted in FIG. 14, to effect the withdrawal of the shot pin 157 thereby releasing the magazine for rotation.

Deenergization of the shot pin engaged relay 393 also returns its associated contact bar 393D, line L22, to its normal open position thereby effecting the deenergization of the tool change relay 398. The deenergized relay 393 also operates to return its associated contact bar 393B, in line L6, to its normally closed position. Upon return of the contact bar 393B to its normal closed position, a circuit is completed along line L6, through the now closed contact bar 391A, the now closed contact bar 393B, and the closed contact bar 480B of the deenergized magazine counterclockwise rotation relay 480, to the coil of the magazine clockwise rotation relay 392, which is connected to the energized conductor 374. The energized relay 392 operates to move its associated contact bar 392A, in line L41, to a closed position. This will condition the circuit to the socket counter 462 for utilization in conjunction with clockwise rotation of the magazine 48. The relay 392 also operates to move another normally open contact bar 392B, in line L71 of FIG. 15A, to a closed position. With the contact bar 392B in closed position, a circuit is established along the line L71 for energizing the solenoid 286 associated with the valve 282. The valve is now operated to effect the operation of the motor 96 in a direction to rotate the magazine 55 in a clockwise direction, as viewed in FIG. 9.

As previously mentioned, the energized tool change complete relay 481 operates to move its associated normally open contact bar 481C, in line L29, to a closed position. This movement of the contact bar 481C to a closed position operated to complete a circuit along line L29, through the now closed contact bar 481C, the closed contact bar 467B, to a now closed contact bar 485A of an energized reset relay 485. The reset relay 485 is energized at this time because the limit switch 137, in line L41, has not as yet been actuated. As a result, both of the socket counters 461 and 462, as well as the forward counter 463 reset to "zero" count and a differential input signal to the comparator 466 is not obtained. This means coincidence exists in the comparator 466 and it operates to transmit a voltage to the coil of the reset relay 485 to energize it. The relay 485 thereupon operates to move its contact bar 485A to a closed position. Thus, the circuit along line L29 continues on through the contact bar 485A to line L30 and thence through line L30 to the coil of a magazine movement satisfied relay 482 to energize the relay.

With the relay 482 energized, it operates to actuate its associated contact bars 482A to 482F inclusive, in lines L8, L20, L33, L39, L43 and L60 from the normal positions they occupy, depicted in FIG. 15. The movement of the contact bar 482C, in line L33, to closed position completes a maintaining circuit for retaining the relay 482 energized until the next succeeding tool is located in the ready station 53. The movement of the normally closed contact bar 482E, in line L43, to an open position operates to insure that the counter 463 is retained deenergized so as not to be actuated when the socket sensing switch 137, in line L41, is actuated as the magazine moves in a clockwise direction. On the other hand, the contact bar 482C, in line L39, is moved to a closed position and operates to condition the circuit to the counter 462 so that upon actuation of the socket counting limit switch 137, the counter 462 will be actuated.

The control system is now conditioned for effecting clockwise movement of the magazine 55 for locating a succeeding tool at the ready station 53. Also, the socket counting circuit is conditioned for operation to count the number of sockets of the magazine that are moved into the ready station 53 in the movement for locating the next succeeding tool at the ready station 53.

Simultaneously with the conditioning of the control system for rotating the magazine and for counting the sockets, the stepping switch 420 is also conditioned for a subsequent tool change cycle. This occurs at the time that the relay 482 is energized. As previously mentioned, the energized relay 482 operates to move its associated contact bars from their normal positions. As a result, a contact bar 482E, in line L60, is moved to a closed position. With the contact bar 482E in a closed position, a circuit is completed from the energized conductor 373, along line L60, through the now closed contact bar 482E to the contact 417 of the bank of contacts 418. The circuit continues from the contact 417 through the wiper arm 421 and thence through the balance of the connected circuitry, previously described, to effect the actuation of the stepping switch relay 442. The actuated relay 442 operates to effect the advancement of the wiper arms 421 and 422 into engagement with the first contacts 406 and 426, respectively, of each of the bank of contacts 418 and 425. With the wiper arm 421 positioned in engagement with the first contact 406 of its associated bank of contacts 418, a circuit would normally be established for again energizing the coil of the stepping relay 442. However, at this time, a contact bar 398D, in line L63, of the deenergized tool change relay 398 is in its normal open position so that a circuit cannot be completed through it. The contact 426 of the bank of contacts 425, with which the wiper arm 422 is now engaged, is a dead contact and, therefore, has no effect in the control system.

Returning now to the operation of the magazine for locating the next succeeding tool in the read station 53, the magazine movement is in a clockwise direction, as viewed in FIGS. 9 and 11. Thus, as the magazine rotates in a clockwise direction, the now empty storage socket 105A is moved out of the ready station 53 and into the restock station 54. On the other hand, the storage socket 105B with the tool 50A stored therein will move into the ready station 53. The movement of the storage socket 105B towards the ready station 53 will actuate the socket sensing or counting switch 137. As the socket 105B continues in its movement towards the ready station 53, the switch 137 will be released. In FIG. 15, line L41, the switch 137 is depicted in its normal deactuated position. When the switch is actuated, its switch contact bar 137A is moved to a closed position to establish a circuit along line L41, through the now closed contact bar 137A, the closed contact bars 402D and 392A to line L40. The circuit continues along line L40 to the line L39 and thence through the closed contact bar 482C to the socket counter 462. As the magazine continues its clockwise movement, the socket 105B will move past the switch 137, the switch will be deactuated, and its contact bar 137A returned to the normal open position. The circuit to the counter 462 is interrupted and the counter will return to its original state. The actuation and deactuation of the socket sensing switch 137 constitutes a single pulse that is registered by the counter. It will be recalled that the counter 462 was defined as being of a type that a first pulse is registered as a "zero" count, a second pulse to the counter will register as a "one" count, a third pulse will register as a "two" count, etc. Therefore, the single pulse to the counter 462 registers a "zero" count and the counter does not transmit a signal to either the comparator 464 or to the comparator 466. At this time, the counters 461 and 463 are deenergized and they do not operate to transmit a signal to the comparators 464 or 466, respectively. Therefore, coincidence exists in the comparator 464 and it continues to transmit energizing voltage to the coil of the relay 467 to maintain the relay energized. Similarly, coincidence exists in the comparator 466 since the counters 462 and 463 have no outputs and the comparator continues to transmit an energizing voltage to the coil of the relay 485 to maintain it energized.

As the socket 105B moves into the ready station 53, the tool sensing switch 143 is actuated. With the switch 143 actuated, its associated contact bar 143A will be moved to a closed position to complete a circuit along line L10, in FIG. 15, to energize the coil of the shot pin engaged relay 393. The energized relay 393 operates to move its contact bar 393C, in line L73, to a closed position thereby completing a circuit to energize the solenoid 311 associated with the valve 300. This will operate the actuator to move the shot pin 157 into engagement with a socket, in this case socket 105A, to stop magazine movement. The tool storage socket 105B, with the next succeeding tool 50A to be used in the spindle, is now located at the ready station 53. On the other hand, the empty storage socket 105A is located at the restock station 54 in position to receive the tool 50 in the spindle 47 after the work operation has been completed with the tool.

The energized relay 393 also operates to move its normally closed contact bar 393B, in line L6, to an open position. This will effect the deenergization of the magazine clockwise rotation relay 392, which in turn effects deenergization of the solenoid 286 of the valve 282. The valve spool 283 is biased to its central position and the operation of the magazine motor 96 is discontinued. Simultaneously the contact bar 482C, in line L39, is returned to its open position while the contact bar 482D is returned to its normally closed position. Also, the contact bar 393D, in line L22, of the energized shot pin engaged relay 393 is moved to its closed position. Thus, the circuit to the coil of the tool change relay 398 is now conditioned for subsequent completion upon either the actuation of the pushbutton switch 396, or the closing of the automatic contact bar 397, by a signal obtained from the record. In either case, when the spindle has completed the required work operation with the tool 50 and is in the tool change position, depicted in FIG. 1, a tool change cycle of operation will be initiated, either manually or automatically, and the tool change relay 398 will be energized to effect such cycle of operation, as previously described.

In this tool change cycle of operation, the various components are in the position, depicted in FIG. 12L, wherein the storage sockets 105B with the tool 50A and the empty storage socket 105A are in the ready station 53 and the restock station 54, respectively. The spindle 47 has the tool 50, and the tool change arm 56 is in the parked position. Thus, when the arm 56 has been moved through the steps in the cycle and is in the extended horizontal position, depicted in FIG. 12F, with the tool 50A in the grip 61 and the tool 50 in the grip 62, the limit switches 241 and 246, depicted in FIG. 13F, will be actuated, as previously described. With the limit switch 246 actuated, its associated normally closed contact bar 246C, in line L52, is moved to an open position. This will effect deenergization of the arm clockwise relay 454 which stops the operation of the motor and the arm is maintained in the extended horizontal position. Also, the normally open contact bar 246A, in line L44, of the now actuated limit switch is moved to a closed position, and since the limit switch 241 is also actuated so that its associated contact bar 241A is in a closed position, a circuit is completed to energize the magazine counterclockwise rotation relay 480. This would normally effect the operation of the magazine motor 96 in a direction to move the magazine in a counterclockwise direction, as viewed in FIG. 9. However, at this time the magazine counterclockwise rotation movement satisfied relay 467 is also energized. This is true because, as previously mentioned, when the storage socket 105B was previously moved into the ready station 53, only a single pulse was transmitted to the counter 462. As a result, it registers a "zero" count. As a result, both the counter 461 and the counter 462 register "zero" counts so that a differential voltage to the comparator 464 is not obtained and coincidence exists in the comparator 464. The comparator 464, therefore, continues to transmit an energizing voltage to the coil of the relay 467 to energize the relay. Thus, with the relay 467 energized, its associated normally open contact bar 467A, in line L15, is in a closed position. Since the initial tool relay 402 and the tool change relay 398 are both energized at this time, a circuit is completed to energize the shot pin engaged relay 393. Thus, the shot pin 157 is in engagement with the socket 105A and operates to prevent rotation of the magazine so that energization of the magazine counterclockwise rotation relay 480, at this time, will not effect rotation of the magazine. The storage socket 105A remains in the restock station 54.

With the relay 467 energized it also operates to move its associated normally open contact bar 467D, in line L48, to a closed position. This will complete a circuit to energize and actuate the stepping switch relay 442, moving the wiper arms 421 and 422 into engagement with contacts 412 and 432, respectively. A circuit is now completed from the contact 432 for once again energizing the arm clockwise rotation relay 454 to continue the movement of the arm 56 to the tool change position depicted in FIG. 12G. In the tool change position the grip 62, with the previously used tool 50, is adjacent the storage socket 105A, and the grip 61, with the succeeding new tool 50A, is adjacent the spindle 47. The control system operates, as previously described, to effect the step-by-step operation of the arm for inserting the tool 50 in the socket 105A in which it was originally stored, while the tool 50A is inserted in the spindle 47, for the performance of a work operation. With this accomplished, the arm 56 will finally be positioned in the retracted horizontal parked position depicted in FIGS. 12K or 12A.

If all the storage sockets had regular tools stored in them, the cycle of operation described above would be repeated over and over again until the last tool in the first set of tools was inserted and removed from the spindle 47. However, in the interest of illustrating the adaptability of the present invention in which uncoded small diameter tools and uncoded large diameter tools are capable of being stored in the magazine 55, some large diameter tools have been shown as being stored in the sockets. With this condition, it will be recalled, the storage sockets on either side of a large tool remain empty. Thus, in the present instance, the next succeeding tool in the set of tools is depicted as a large tool 50B which is stored in the storage socket of 105D. Consequently, the storage sockets 105C and 105E are empty. Therefore, the storage socket 105A, with the tool 50 returned thereto, is in the restock station 54; the now empty storage socket 105B, in which the tool 50A now in the spindle 47 was originally stored, is in the ready station 53; the empty storage socket 105C is adjacent to the ready station 53, and the storage socket 105D with the large diameter tool 50B stored therein is in a position two locations to the right, as viewed in FIG. 9, from the ready station 53.

Since the large diameter tool 50B is the next succeeding tool to be located at the ready station 53, the magazine 55 must be operated to pass the empty storage socket 105C thorugh the ready station and must stop when the storage socket 105D is in the ready station 53. This movement of the magazine 55 to locate the succeding tool 50B in the ready station 53 is initiated after the spindle 47 has completed the work operation with the tool 50A. It will be recalled that the last movement of the stepping switch 420 occurred when the arm 56 was returned to the parked position and actuated the switch 246 moving its associated contact bar 246B, in line L59, to a closed position. At this time, the wiper arms 421 and 422 are in engagement with the contacts 416 and 436, respectively. Thus, with the contact bar 246B in a closed position, a circuit is completed to energize the stepping switch relay 442, thereby actuating the relay for advancing the wiper arms. This action moves the wiper arms 421 and 422 into engagement with contacts 417 and 437, respectively. With the wiper arm 422 in engagement with the contact 437, a circuit is completed to energize the tool change complete relay 481 which then operates to move its associated contact bar 481D, line L39A, to a closed position. At this time, the reset relay 485 is energized and its contact bar 485B, in line L32, is in a closed position. Thus, a circuit is established to energize and actuate a counter reset device 475. When the rest device 475 is energized it operates to transmit a single reset signal pulse to the counters 461, 462 and 463 to restore them to their original state. The energized relay 481 also operates to move its normally closed contact bar 481A, in line L10, to an open position and move its normally open contact bar 481C, in line L29, to a closed position. As a result, the shot pin engaged relay 393 is deenergized to effect the withdrawal of the shot pin 157 to release the magazine 55 for rotation. With the contact bar 481C in a closed position, the relay 482 is energized and it, in turn, conditions the circuit to the socket counter 462 for subsequent energization.

With the shot pin engaged relay 393 deenergized, its associated contact bar 393B, in Line L6, is returned to its normally closed position thereby completing a circuit to energize the magazine clockwise rotation relay 392. The energized relay 392 operates to effect the operation of the motor 96 in a direction to move the magazine in a clockwise direction, as viewed in FIG. 9. With the magazine 55 moving in a clockwise direction, the empty socket 105B is moved out of the ready station 53 and the next adjacent empty socket 105C is moved into the ready station 53. As the socket 105C passes the limit switch 137, FIGS. 9 and 11, and diagrammatically in line L41 of FIG. 15, the contact bar 137A is moved to a closed and open position. As a result, a single input pulse is transmitted to the counter 462 and registers a "zero" count. Since the storage socket 105C does not have a tool stored in it, the tool sensing switch 143 at the ready station 53 is not actuated and the magazine will continue to move in a clockwise direction. The empty storage socket 105C is moved out of the ready station 53 and into the restock station 54 while the storage socket 105D with the next succeeding tool 50B is moved to the ready station 53. As the storage socket 105D passes the socket sensing switch 137, the switch is actuated and deactuated, which results in another pulse being transmitted to the counter 462 so that it is now actuated to register a count of "one." As a result, the counter 462 operates to transmit a single pulse to the comparator 466 while the counter 463 does not. Therefore, coincidence in the comparator 466 will not exist and the energizing voltage transmitted by the comparator to the coil of the relay 485 is interrupted. The relay is deenergized and operates to move its associated contact bar 485A, in line L29, to its normal open position. This would normally serve to effect the deenergization of the magazine movement satisfied relay 482, in line L31. However, at this time, the relay 482 is retained energized through a maintaining circuit, through its now closed contact bar 482B and the normal closed contact bar 393F, both in line L33. The magazine 55 continues to be moved until the storage socket 105D with the next succeeding tool 50B stored therein is in the ready station 53. Also, with the magazine movement satisfied relay 482 energized, its associated contact bar 428E, in line L60, will be in a closed position. This will effect the advancement of the wiper arms 421 and 422 into engagement with contacts 406 and 426, respectively, resetting the stepping switch 420 for the next tool change cycle of operation.

As the storage socket 105D, with the tool 50B stored therein, moves into the ready station, the tool sensing switch 143 is actuated and its contact bar, in line L10 of FIG. 15, is moved to a closed position. This effects the energization of the shot pin engaged relay 393 and the shot pin 157 is moved into magazine engagement. The energized relay 393 also operates to effect the deenergization of the magazine clockwise rotation relay 392 to stop the operation of the magazine motor 96.

Upon the energization of the shot pin engaged relay 393, its associated contact bar 393F, in line L33, is moved to an open position thereby interrupting the maintaining circuit to the coil of the relay 482. As a result of the deenergization of the relay 482, its associated contact bars 482C and 482D, lines L39 and L43 respectively, are returned to their normally open and closed positions. This effectively prevents a pulse being transmitted to the counter 462, so that this counter retains the "one" count presently therein and serves as a memory. On the other hand, the counters 461 and 463 both have a "zero" count. As a result, coincidence does not exist in either the comparator 464 or the comparator 466 and the relays 467 and 485 are therefore both deenergized at this time.

A cycle of operation of the tool change arm 56 is now initiated to effect the interchange of the tool 50B with the tool 50A in the spindle 47. This cycle is initiated, either automatically or manually by the actuation of the pushbutton switch 396 or the closing of the automatic contact 397, as previously described. In either case, the tool change relay 398 is energized to effect that actuation of the stepping switch 420 in a step-by-step movement thereby effecting the operation of the tool change arm 56, as fully described above. When the tool change arm 56 has been moved through the series of steps and has been moved to the extended horizontal position, depicted in FIG. 12F, with the tool 50B withdrawn from the storage socket secured in the grip 61 and the previously used tool 50A from the spindle 47 secured in the grip 62, the limit switches 241 and 246 will be actuated, as depicted in FIG. 13F. With both switches actuated, their associated contact bars 241A and 246A, respectively, in line L44 of FIG. 15, will be in closed positions, thereby completing the circuit along line L44 to energize the magazine counterclockwise rotation relay 480. At this time, the shot pin engaged relay 393 is deenergized and the shot pin 157 is withdrawn from engagement with the magazine. Thus, the magazine motor 96 will continue to operate to drive the magazine in a counterclockwise direction. This counterclockwise movement of the magazine will locate the original storage socket 105B in the restock station 54 so that the tool 50A secured in the grip 62 can be replaced into its original storage socket. As the magazine moves in a counterclockwise direction, the now empty storage socket 105D is moved out of the ready station 53 and will actuate and deactuate the socket sensing switch 137. An energizing pulse will be transmitted along line L41, through the now closed contact bar 402D, through a connected conductor 487, to line L37 and thence through a now closed contact bar 480C to the counter 461. This single pulse will actuate the counter 461 to register a count of "one" therein. As a result, the counter is activated and transmits a signal to the comparator 464. Thus, since both counters 461 and 462 are transmitting "one" count signals to the comparator 464, coincidence will exist in the comparator and it will will operate to transmit an energizing voltage to the relay 467 to energize it. At this time, coincidence does not exist in the comparator 466 because the counter 463 has a "zero" count. Therefore, the relay 485 remains deenergized. The energized relay 467 operates to move its associated contact bar 467A, in line L15, to a closed position. This completes a circuit along line L15, through the three now closed contact bars 402A, 398C and 467A to line L13. The circuit continues along line L13 to line L10 and thence through the now closed contact bar 391B and a connecting conductor 488 to line L12. The energizing circuit continues along line L12, through a normally closed contact bar 490A of a deenergized program complete relay 490, to line L11 and thence to line L10 and through the normally closed contact bar 481A of the deenergized tool change complete relay 481 to the coil of the relay 393 which is connected to the energized conductor 374 to energize the relay. Energization of the relay 393 will effect operation of the shot pin 157 to move it into magazine engagement thereby stopping the counterclockwise movement of the magazine and locating the storage socket 105B in the restock station 54 in position to receive the tool 50A from the grip 62 of the tool change arm 56.

Simultaneously, with the energization of the shot pin engaged relay 393 to stop the movement of the magazine, the arm clockwise relay 454 is again energized to effect the continued movement of the tool change arm 56 to the tool change position. This is accomplished when the relay 467 is energized and operated to move its associated contact bar 467D, in line L48, to a closed position. With the movement of the contact bar 467D to a closed position, a circuit is completed to the contact 411 of the bank of contacts 418. At this time, the wiper arm 421 is positioned in engagement with the contact and the circuit continues through the wiper arm 421 to energize the stepping switch relay 442. As previously described, this will effect advancement of the wiper arms 421 and 422 moving them into engagement with the next adjacent contacts 412 and 432, respectively. With the wiper arm 422 positioned in engagement with the contact 432, a circuit is established to energize the arm clockwise rotation relay 454. The arm 56 carrying the tools 50B and 50A will thereupon be moved from the extended horizontal position to the extended tool change position depicted in FIG. 12G. In this position of the arm, the previously used tool 50A secured in the grip 62 is disposed adjacent to the storage socket 105B, while the new tool 50B secured in the grip 61 is disposed adjacent the spindle 47. The step-by-step movement of the arm 56, as previously described, continues so that the tool 50B is placed in the spindle 47 and the previously used tool 50A is returned to its original storage socket 105B and the arm 56 is returned to its parked position.

With the arm 56 returned to the parked position, the limit switch 246, as depicted in either FIG. 13K or FIG. 13A, will again be actuated. At this point, the stepping switch 420 will have been actuated wherein the wiper arms 421 and 422 are positioned in engagement with the contacts 416 and 436, respectively. Thus, with the limit switch 246 actuated, its associated contact bar 246B, depicted in line L59 of FIG. 15, will be in a closed position. As a result, the stepping switch relay 442 will be energized and will operate to advance the wipers 421 and 422 and position them in engagement with the contacts 417 and 437, respectively.

This will effect the energization of the tool change complete relay 481. The energized relay 481 thereupon operates to move its associated normally open contact bars 481c and 481D, in lines L29 and L39A, to closed positions. This action has no effect on the control system at this time but conditions the two circuits of which these contact bars are a part, for subsequent energization. The energized relay 481 also moves its associated normally closed contact bar 481A, in line L10, to an open position thereby effecting the deenergization of the relay 393 which, in turn, operates to effect the withdrawal of the shot pin 157 to release the magazine for rotation. With the relay 393 deenergized its associated contact bar 393B, in line L6, is returned to its normally closed position. A circuit is now completed to energize the magazine clockwise rotation relay 392 and the magazine will now be moved in a clockwise direction, as viewed in FIG. 9. At this time, as previously mentioned, the storage socket 105C is in the ready station 53, therefore, as the magazine is moved in a clockwise direction, the now empty storage socket 105D in which the tool 50B was originally stored will actuate the socket sensing switch 137. This will complete a circuit to the counter 463 so that an input pulse is transmitted to the counter. The counter is now actuated to register a "one" count therein. It will be recalled that the counter 462 has presently stored in it a "one" count. Therefore, with the counter 462 and the counter 463 both having a "one" count registered in them, coincidence will be obtained in the comparator 466 and the relay 485 will be energized.

The energized relay 485 operates to move its associated contact bar 485B, in line L32, to a closed position. Since the contact bar 481D, in line L39A, has been previously closed a circuit is now completed along line L39A, through a connected vertical conductor 491, through line L32 and through the now closed contact bar 485B to line L33. The circuit continues along line L33 to another connecting vertical conductor 492 to the reset mechanism 475 which is connected to the energized conductor 374. Energization of the reset mechanism operates to transmit a reset signal to the counters 461, 462 and 463 to return them to their original state where "zero" counts are registered in all counters.

The energized relay 485 also operates to move its contact bar 485A, in line L29, to a closed position. This completes a circuit for energizing the magazine movement satisfied relay 482. With the relay 482 energized, its associated normally closed contact bars 482A and 482D, in lines L20 and L43 respectively, are moved to open positions. Also, associated normally open contact bars 482B and 482C, in lines L33 and L39 respectively, are moved to closed positions. The movement of the contact bar 482C to a closed position serves to condition the circuit to the counter 462 for subsequent actuation of the counter. On the other hand, the movement of the contact bar 482D to open position serves to interrupt the circuit to the counter 463 so that it cannot receive an energizing pulse. Thus, with the magazine continuing to be moved in a clockwise direction, only the counter 462 will receive pulses to count the number of sockets passing the socket sensing switch 137. The tool change relay 398 is also deenergized at this time because the contact bar 482A, in line L20, is in an open position. With the tool change relay 398 deenergized, its associated contact bar 398D, in line L63, is returned to its normally open position. The energized relay 482 also operates to move its associated contact bar 482E, in line L60, to a closed position. This will effect a stepping movement of the stepping switch 420 and the associated wiper arms will be moved to their initial positions into engagement with the contacts 406 and 426. The stepping switch 420 is now conditioned for the next tool change arm cycle of operation. With the wiper 422 moved to its initial position, the circuit for energizing the tool change complete relay is interrupted and it operates to return its associated contact bars to their normal positions.

With the above described relays actuated as mentioned, the magazine motor 96 continues to operate to move the magazine in a clockwise direction. Thus, since the storage socket 105D has been moved past the socket sensing switch 137, the adjacent socket 105E will actuate the switch. This will result in a pulse being transmitted to the memory counter 462, but since this is the initial pulse, the count remains at "zero." Movement of the magazine in the clockwise direction is continued and the storage socket 105F with the next succeeding tool 50C stored therein is moved into a position to actuate the sensing switch 137. As a result another pulse is transmitted to the memory counter 462 and it operates to register a count of "one."

The magazine motor 96 continues to operate, moving socket 105F with the tool 50C, which is the next succeeding tool to be used, into the ready station 53. The tool 50C in the socket 105F will actuate the socket sensing switch 143 which thereupon operates to effect the energization of the shot pin engaged relay 393 to stop magazine movement. With the relay 393 energized, the circuit to the magazine clockwise rotation relay 392 is interrupted to effect deenergization of the relay.

After a work operation has been completed by the spindle 47 with the tool 50B, a tool change cycle of operation will again be initiated to transfer the next succeeding tool 50C into the spindle 47 and simultaneously transfer the previously used tool 50B from the spindle 47 into its original storage socket 105D. To this end, the tool change relay 398 is again energized to initiate the tool change arm cycle of operation, as previously described. With the tool change relay 398 energized, the arm 56 will be operated to withdraw the tool 50C from the storage socket 105F and simultaneously withdraw the previously used tool 50B from the spindle 47. During this cycle of operation of the tool change arm, the magazine must be moved in a counterclockwise direction to locate the storage socket 105D in the restock station 54 so that the previously used tool 50B will be returned to its original storage socket. This is accomplished when the arm with the tools 50B and 50C has moved to the extended horizontal position depicted in FIG. 12F. In the extended horizontal position of the arm 56, the limit switches 241 and 246 are both actuated and operated to effect the energization of the magazine counterclockwise rotation relay 480, as previously described. As a result, the contact bar 480C, in line L35, is moved to a closed position, conditioning the circuit to the counter 461 for subsequent energization of the counter. It will be recalled that the storage socket 105F is presently located in the ready station, therefore, the adjacent empty socket 105E is located in the restock station 54 with the desired empty socket 105D to the left of the restock station 54. Thus, movement of the magazine in a counterclockwise direction will move the storage socket 105D into the restock station 54. As this movement occurs, the now empty storage socket 105F will be moved to the right, as viewed in FIG. 9, out of the ready station 53 and will actuate the socket sensing switch 137. The actuation of the switch 137 completes the previously conditioned circuit to energize the counter 461 so that the counter will register a "one" count. It will be recalled that the previous forward movement of the magazine had caused a "one" count to be stored in the memory counter 462. Thus, with the counters 461 and 462 both having "one" counts registered in them, coincidence in the comparator 464 is again obtained and the relay 467 is energized. As a result, the shot pin engaged relay is energized and the shot pin 157 moved into magazine engagement to stop magazine rotation, with the storage socket 105D located in the restock station 54 in position to receive the tool 50B from the grip 62 of the arm 56. The energized relay 467 also operates to move its associated contact bar 467D to closed position, in line L48, thereby effecting the advancement of the stepping switch 420 to again effect the movement of the arm 56 to position it in the tool change position depicted in FIG. 12G. Operation of the tool change arm 56 continues, as previously described, to insert the new tool 50C into the spindle 47 and to insert the previously used tool 50B into its original storage socket 105D. After this, the arm 56 is returned to the retracted horizontal parked position depicted in FIG. 12K. With the arm 56 again in parked position, the limit switch 246 is again actuated and the stepping switch 420 is actuated to advance the wiper arms 421 and 422 into engagement with the contacts 417 and 437, respectively. As a result, the tool change complete relay 481 is energized and it will operate to move its associated contact bars out of the normal positions they occupy in FIG. 15. This will effect deenergization of the shot pin engaged relay 393 to effect the release of the magazine. With the relay 393 deenergized, its associated contact bar 393B is returned to its normal closed position thereby effecting the energization of the magazine clockwise rotation relay 392. The magazine 55 will now be moved in a clockwise direction to advance the next storage socket 105H with the last tool 50D therein into the ready station 53.

As the magazine moves in a clockwise direction, the socket sensing switch 137 will be actuated by the storage socket 105F. At this time, the relay 467 is energized and the relay 482 is deenergized. Therefore, with the socket sensing switch 137 actuated, a circuit is completed to the counter 463 to actuate it to register a count of "one." Since the counter 462 has a count of "one" stored in it, coincidence is obtained in the comparator 466 and the relay 485 is energized. The energized relay 485 operates to move its associated contact bar 485B, in line L32, to a closed position, and with the contact bar 481D previously moved to a closed position, a circuit is completed to energize the reset mechanism 475. The energized reset mechanism operates to return all the counters to their original state.

With the relays 467, 485 and 481 energized, a circuit is completed along lines L29 and L30 to line L31 to energize the relay 482. The contact bar 482E is moved to a closed position and the stepping switch 420 is again actuated wherein the wiper arms 421 and 422 are advanced to their initial positions into engagement with the contacts 406 and 426, respectively, for the next tool change arm cycle of operation. With the relay 482 energized, its contact bar 482C is moved to a closed position while the contact bar 482D is moved to an open position. This conditions the circuit to the counter 462 for subsequent operation.

Movement of the magazine 55 continues in a clockwise direction until the storage socket 105H, with the tool 50D stored therein, is positioned at the ready station 53. In moving the socket 105H into the ready station 53, the socket sensing switch 137 is actuated two more times, once by the socket 105G and again by the socket 105H as they are moved past the switch. As a result of this double actuation of the switch 137, a count of "one" is registered in the counter 462.

As the storage socket 105H is moved into the ready station 53, the tool 50D stored therein actuates the tool sensing switch 143. This effects the energization of the shot pin engaged relay 393 to stop movement of the magazine. The next succeeding tool 50D is now in the ready station 53 in position to be transferred to the spindle 47 for the next work operation. It will be assumed that the tool 50D is the last tool in the set of tools that are to be used in the present work operation.

After the spindle 47 has completed a work operation with the tool 50C, a tool change arm cycle of operation will be initiated by the energization of the tool change relay 398. However, since the tool 50D is assumed to be the last tool of the particular set of tools, a last tool relay 495 will also be energized in conjunction with the energization of the tool change relay 398. The energization of the last tool relay 495 will insure that the tool 50D is subsequently returned to its original storage socket 105H, but no tool will be inserted into the spindle 47; and that the machine control system will be returned to the initial condition established for the first tool setup. After the work operation with the tool 50C has been completed, the last tool relay 495 is energized, either automatically by a signal obtained from the record 383 which actuates an automatic contact 496, in line L25, to a closed position, or manually by depressing a pushbutton switch 497 in line L24. In either case, prior to energizing the tool change relay 398, the last tool relay 495 is energized. Energization of the relay 495 will effect the movement of associated normally open contact bars 495A, 495B, 495C and 495D, in lines L8, L23, L28 and L2 respectively, to closed positions. The movement of these contact bars to closed positions has no immediate effect upon the control system but simply conditions portions of the control system for subsequent use. As previously described, with the relay 398 energized, the tool change arm 56 is operated in its cycle of movements. When the arm 56, with the tool 50D in the grip 61 and the tool 50C in the grip 62, is moved into the extended horizontal positions, depicted in FIG. 12F, the limit switches 241 and 246 will be actuated. With the switch 246 actuated, its associated contact bar 246C, in line L52, is moved to an open position and interrupts the circuit to the coil of the arm clockwise rotation relay 454. This stops the rotation of the arm 56 holding it in the extended horizontal position until the magazine has been moved counterclockwise to locate the storage socket 105F in the restock station 54 in position to receive the tool 50C from the grip 62.

With the switches 241 and 246 both actuated, a circuit is completed along line L44 to energize the magazine counterclockwise rotation relay 480 and the magazine is rotated in a counterclockwise direction, as viewed in FIG. 9. It will be recalled that the counter 462 has a count of "one" stored in it at this time; that the shot pin engaged relay 393 is deenergized because the tool 50D has been withdrawn from its storage socket 105H thereby deactuating the tool sensing switch 143; and, that the magazine clockwise rotation relay 392 is deenergized so that its contact bar 392A, in line L41, is in its normal open position. Since the relay 480 is energized, its contact bar 480C, in line L35, is in a closed position. Thus, as the magazine is moved in a counterclockwise direction, the storage socket 105H will be moved out of the ready station and will actuate the socket sensing switch 137. With the switch 137 actuated, its contact bar 137A, in line L41, will be in a closed position thereby completing a circuit to transmit a pulse to the counter 461. This causes the counter 461 to register a "one" count. With both of the counters 461 and 462 each having "one" counts registered in them, coincidence is obtained in the comparator 464 and the relay 467 is energized. The energized relay 467 operates to move its associated contact bar 467A, in line L15, to a closed position. This completes a circuit to energize the relay 393 to effect the engagement of the shot pin 157 with the magazine, stopping magazine rotation locating the storage socket 105F in the restock station 54. The energized relay 467 also operates to move its associated contact bar 467D, in line L48, to a closed position. With the contact bar 467D in closed position, a circuit is again complete for energizing the stepping switch relay 442 to actuate it. The stepping switch 420 is again operated to effect a continuation of tool change arm movement in a clockwise direction to position the arm in the tool change position depicted in FIG. 12G. The sequence of operation of the tool change arm 56 continues, as previously described in detail, to insert the new tool 50D into the spindle 47 and the previously used tool 50C into its original storage socket 105F and thereafter return the arm 56 to its parked position.

The stepping switch 420 at this time has been operated so that the associated wiper arms 421 and 422 are presently in engagement with contacts 416 and 436, respectively. Therefore, when the arm 56 is returned to its parked position, the limit switch 246 will again be actuated. This will again effect the energization of the stepping switch relay 442 to actuate and operate the stepping switch to advance the wiper arms 421 and 422 into engagement with the last contacts 417 and 437, respectively, of each bank of contacts 418 and 425, respectively.

With the wiper arm 422 in engagement with the contact 437, a circuit is complete for energizing the tool change complete relay 481. The normally closed contact bar 481A, line L10, of the relay 481 is moved to open position to interrupt the circuit to the coil of the relay 393 to deenergize the relay. The deenergized relay 393 effects the releases of the magazine and also returns its contact bar 393B, in line L6, to its normally closed position. As a result, the magazine clockwise relay 392 is energized to effect clockwise rotation of the magazine. Also, the normally open contact bar 392A of the energized relay 392, in line L41, is closed to condition the circuit to the counter 463 for subsequent energization of the counter.

The energized relay 481 also operated to move its associated contact bar 481B, in line L28, into a closed position, and since the last tool relay 495 is energized, its associated contact bar 495C, in line L28, is also in a closed position. Therefore, a circuit is establlished to energize a magazine program complete relay 490.

The energized relay 490 operates to move associated normally closed contact bars 490A in line I12, 490D in line L44, and 490E in line L48, to open positions. Also, the energized relay 490 operates to move normally open contact bars 490B in line L26 and 490C in line L27, to closed positions. With the contact bar 490B moved to a closed position, a maintaining circuit is established around the tool change complete contact bar 481B to retain the relay 490 energized upon the subsequent deenergization of the relay 481. The movement of the normally closed contact bar 490A to an open position operates to prevent the shot pin engaged relay 393 from being energized until the reset relay 485 is subsequently energized. The now open contact bar 490D insures that the magazine counterclockwise rotation relay 480 cannot be energized. On the other hand, the movement of the normally open contact bar 490C, in line L27, to a closed position conditions a circuit to the coil of a timer relay 498 for subsequent energization at the time that the arm 56 is moved in its cycle of operation to the extended horizontal position.

With the relays 393 and 480 both deenergized, the circuit for energizing the magazine clockwise rotation relay 392 is completed and the magazine will be moved in a clockwise direction. In this movement of the magazine, the storage socket 105F with the tool 50C stored therein is moved leftwardly out of the restock station 54. On the other hand, the storage socket 105H is also moved leftwardly into the ready station 53. As the storage socket 105H is moved past the socket sensing switch 137, the switch will be actuated. A circuit is now completed along line L41, through the now closed contact bar 137A of the actuated switch 137 to the now closed contact bar 402D of the energized first tool relay. The circuit continues through the contact bar 402D and through the now closed contact bar 392A of the energized relay 392, to line L42, and thence to line L43 and through the normally closed contact bar 482D of the deenergized relay 482 and the now closed contact bar 467C of the energized relay 467 to line L42 and then to the counter 463 to momentarily energize the counter. The energized counter 463 now operates to register a "one" count therein. The memory counter 462 had a "one" count previously stored therein, thus, with both of the counters 462 and 463 registering "one" counts, coincidence is again obtained in the comparator 466 and it operates to energize the reset relay 485. With the reset relay 485 energized, it operates to move its associated normally open contact bar 485B, in line L32, to a closed position. With the contact bar 485B now closed and the contact bar 481D, in line L39, in a closed position, a circuit is now completed to energize the reset mechanism 475 and operates to return all the counters to their original state.

The energized relay 485 also operates to move its contact bar 485A, in line L29, to a closed position. Since the contact bars 481C and 467B have been previously moved to closed positions, the movement of the contact bar 485A to a closed position completes a circuit for energizing the magazine movement satisfied relay 482. As a result, the energized relay 482 operates to move its normally open contact bar 482E, in line L60, to a closed position. This will effect the energization of the stepping switch relay 442 to actuate it and thereby advance the wiper arms 421 and 422 to their initial positions in engagement with the contacts 406 and 426.

With the wiper arm 422 moved to its initial position depicted in FIG. 15, the circuit to the relay 481 is interrupted and the relay is deenergized. The deenergized relay 481 operates to move its contact bar 481C, in line L29, to an open position to effect deenergization of the relay 482. At this time, the maintaining circuit for the relay 482, along line L33, is interrupted because the shot pin engaged relay 393 is energized through a circuit established along line L8, through the now closed contact bar 495A of the energized last tool relay 495, the now closed contact bar 485C of the energized reset relay 485, a normally closed contact bar 498A of a deenergized timer relay 498, to line L7 and thence back to line L10 to the coil of the relay 393 to energize the relay.

The energized shot pin engaged relay 393 operates to move its normally closed contact bar 393F, in line L33, to an open position, thereby interrupting the maintaining circuit to the relay 482. The normally closed contact bar 393B, in line L6, of the energized relay 393 is also moved to an open position. This would normally prevent the magazine clockwise rotation relay 392 from being energized. However, a circuit is established around the now open contact bar 393B via a conductor 493 and a now closed contact bar 495D and a conductor 494 to line L6 and thence to the relay 392 to energize the relay. The shot pin 157 is moved into magazine engagement. Since the tool change arm 56 is in the parked position, only the limit switch 246 is actuated. Thus, a circuit along line L44 is not completed and the magazine counterclockwise rotation relay 480 is maintained deenergized.

The magazine is locked in the position wherein the storage socket 105H is positioned in the ready station 53. The stepping switch 420 is now in its initial position. Upon completion of a work operation with the last tool 50D, the tool change relay 398 is energized. As previously described, this will effect counterclockwise movement of the tool change arm 56 to move it into the position depicted in FIG. 12B. At this time, the empty storage socket 105H is located in the ready station 53. Therefore, the grip 61, upon being moved to an extended position, will not engage a tool. On the other hand, the grip 62 will engage the tool 50D in the spindle 47. The arm 56 continues in its cycle of operation withdrawing the tool 50D from the spindle 47. When the arm 56 with the tool 50D is moved into the extended horizontal position depicted in FIG. 12F, the limit switches 241 and 246 are both actuated and their contact bars 241A and 246A, respectively, are in closed positions. A circuit is now established along line L44 through the now closed contact bars 241A and 246A to a connected vertical conductor 499. The circuit continues through the conductor 499 to line L27 and thence along the line, through the now closed contact bar 398E of the energized tool change relay 398 and the now closed contact bar 490C of the previously energized magazine program complete relay 490 to the coil of the timer relay 498 to energize the relay.

The energized timer relay 498 operates to immediately move its normally closed contact bar 498A, in line L8, to an open position. This will effect the deenergization of the shot pin relay 393 which, in turn, will effect the release of the magazine. At this time, the relay 490 is energized so that its contact bar 490D, in line L44, is in an open position, thereby effectively preventing the energization of the magazine counterclockwise rotation relay 480. On the other hand, with the relay 393 deenergized, its contact bar 393B, in line L6, is returned to its normally closed position. This completes the circuit for energizing the magazine clockwise rotation relay 392. Therefore, when the arm 56 is moved into the extended horizontal position, the magazine will immediately be rotated in a clockwise direction.

As the magazine is moved in a clockwise direction, the arm 56 is maintained in the extended horizontal position because at this time a normally closed contact bar 490E, in line L48, of the energized relay 490 is in an open position. Thus, even though the relay 467 is energized and its associated contact bar 467D, in line L48, is in a closed position, the now open contact bar 490E interrupts the circuit to the stepping switch relay 442. The stepping switch is not actuated at this time and the wiper arms 421 and 422 remain in engagement with the contacts 411 and 431, respectively.

The relay 498 will remain energized as long as the tool change arm 56 is maintained in the extended horizontal position. Since the relay was energized through the circuit established by the actuation of the switches 241 and 246, it is necessary that the arm 56 be moved clockwise out of the horizontal position to release the switches. This is accomplished when the normally open time-to-close contact bar 498B, in line L46, moves to a closed position. The interval of time set for the closing of the contact bar 498B to move to a closed position is sufficiently long enough to permit the magazine to be rotated to position the storage socket 105H in the restock station 54. Upon the movement of the contact bar 498B to a closed position, a circuit is completed around the open contact bar 490E and this circuit will effect the momentary energization of the stepping switch relay 442. This, of course, actuates the stepping switch 420 to advance the wiper arms 421 and 422. With the wiper arm 422 advanced, it will be positioned in engagement with the contact 432 and once again establish a circuit to the arm clockwise rotation relay 454. The arm 56 will now be rotated out of the extended horizontal position to the tool change position depicted in FIG. 12J. When the arm 56 is rotated out of the horizontal position, the limit switch 246 is deactuated. This interrupts the circuit to the timer relay 498 to effect the deenergization of the relay. As a result, the contact bar 498A, in line L8, is returned to its normal closed position and establishes the circuit for energizing the shot pin engaged relay 393.

Normally, the energization of the relay 393 will effect the deenergization of the magazine clockwise rotation relay 392 by reason of the relay 393 operating to move its normally closed contact bar 393B, in line L6, to an open position. However, to insure that the magazine has rotated sufficiently far enough to position the socket 105H in the restock station, a maintaining circuit is established to retain the relay 392 energized. This is accomplished through the normally open contact bar 495D of the last tool relay 495 which is connected in parallel with the contact bar 393B and which is in a closed position with the relay energized. Thus, if the magazine has not moved sufficiently far enough to locate the socket 105H in the restock station 54, the shot pin 157 will engage the face of the locating block 140H secured to the socket 105H. The magazine will continue to be driven because the magazine clockwise rotation relay 392 is retained energized. When the socket 105H is located in the restock station 54, the shot pin 157 will be forcefully moved into registration with the opening provided in the storage socket locating block. This will effectively stop magazine movement even though the magazine clockwise rotation relay 392 is retained energized.

In either case, when the arm 56 is positioned in the tool change position, the storage socket 105H will be in the restock station 54 in position to receive the tool 50D from the grip 62. The cycle of tool arm function will continue, as described above, replacing the tool 50D in its original storage socket 105H. Thereafter, the arm 56 will be moved to the parked position. With the arm 56 returned to the parked position, the stepping switch 420 is actuated to move the wiper arms 421 and 422 to their initial positions in engagement with contacts 406 and 426, respectively. This will effect deenergization of the tool change complete relay 481. Normally, upon the deenergization of the relay 481, the magazine will be driven in a clockwise direction to locate the next succeeding tool at the ready station 53. However, since the last tool relay 495 is still energized, a circuit to the shot pin engaged relay 393 is still completed and the relay remains energized thereby maintaining the shot pin 157 in engagement with the magazine. In FIG. 9, it will be noted that with the storage socket 105H, with the last tool 50D, is located in the ready station 54 and the adjacent storage socket 105I with the tool 50E is in the ready station 53. The tool 50E is the first tool in the next set of tools to be utilized. Thus, with the first tool 50E located in the ready station, the conditions are identical as they existed for the start of the above-described tool change cycle. Therefore, when the next work cycle is initiated, the sequence of events will occur as described above. However, if the socket 105I is an empty socket, the magazine would merely rotate in a clockwise direction to locate the next tool in the ready station upon the initiation of a tool change cycle of operation.

After the last tool 50D has been replaced in its original storage socket 105H and the arm returned to the parked position, the first tool relay 402 will be deenergized. This will be accomplished, either manually by depressing the pushbutton switch 401, in line L19, or automatically by a signal from the record which actuates the automatic contact 399 to an open position. In either case, the circuit to the relay 402 will be interrupted and the relay will be deenergized. As a result, all the associated contact bars will be returned to their normal positions shown in FIG. 15. This returns the control system to its initial condition ready for the next work operation.

From the foregoing detailed description of the illustrative embodiment set forth hereinto exemplify the present invention, it will be apparent that there has been provided a machine tool incorporating an improved mechanical tool changer and having a spindle, as well as a tool storage magazine which carries a supply of non-coded large diameter tools, as well as non-coded smaller diameter tools with the tool changer operating to replace either size of tool in the spindle with either size of new tool from the magazine, and the tools utilized do not need to be coded or otherwise identified.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

The principles of this invention having now been fully explained in connection with the foregoing description, we hereby claim as our invention:

1. In a machine tool having a frame;
   a rotatable tool receiving spindle supported by said frame;
   a tool storage magazine supported by said frame and having a plurality of tool storage positions;

a plurality of tools stored in said storage positions of said magazine;

a tool ready station and a tool restock station, said stations being spaced apart a distance equal to the spacing between the axes of two adjacent storage positions of said magazine, so that a storage position will be located at the ready station and an adjacent storage position will be located at the restock station;

a tool transfer member supported by said frame for rotational and axial movement on a common axis that is disposed between said spindle and stations, said tool transfer member having a pair of tool engaging sockets that are displaced relative to each other 180° ± one-half of the angle from the axis about which the transfer member is movable subtended by two adjacent storage positions; and, power means connected to operate said transfer member in a cycle of operation to simultaneously engage a tool in a storage position located at the ready station and a tool in said spindle and to effect a simultaneous transfer of the tools so engaged to locate the tool from the storage position at the ready station in said spindle and move the tool from said spindle into the storage position at said restock station.

2. In a machine tool having a frame and provided with a spindle adapted to receive a tool for the performance of a work operation;

a tool storage magazine mounted on the frame and having a plurality of storage sockets in which tools are stored for use in said spindle, said magazine having a tool ready station at which tools that are stored in said storage sockets may be successively located and withdrawn for placement in said spindle, said magazine also having a tool restock station at which a selected storage socket may be located so that the tool may be withdrawn from the spindle and returned to its original storage socket in the magazine, said ready station and said restock station being spaced apart a distance equal to the spacing between the axes of two adjacent storage sockets;

a tool transfer member having a pair of tool grips at opposite ends, said transfer member being constructed and arranged so that when said transfer member is in one position, one grip will engage a tool in the ready station while the second grip will engage the previously used tool in the spindle and when said transfer member is in a second position, said first grip will place a tool from the ready station into said spindle while said second grip with the tool from said spindle will place the tool in the storage socket at the restock station; and, power means operably connected to move said transfer member in a tool change cycle of operation.

3. In a machine tool having an operating station arranged to secure different tools;

a frame;

a tool storage magazine movably supported by said frame and having a tool ready station and a tool restock station, said magazine having a plurality of storage positions in which different tools are stored for use in the operating station;

power means connected to move said magazine so that the next succeeding tool to be used in the operating station is moved into the ready station and the preceding empty storage position is moved into the restock station;

a control system operably connected to regulate the movement of said magazine to locate a succeeding tool at the ready station and the empty storage position in which the tool in the operating station was stored at the restock station while the machine tool is operating with the tool from the magazine; and, tool change means operable when actuated to simultaneously remove tools at the ready station and the operating station and place the tool removed from the storage position of the magazine at the ready station into the operating station and simultaneously place the previously used tool from the operating station into its original storage position in said magazine located at the restock station.

4. In a machine tool having a frame and provided with a spindle adapted to receive a tool;

a tool storage magazine mounted on the frame for the storage of tools to be utilized in the spindle and having a ready station at which tools that are stored in the magazine may be successively located and withdrawn for placement in the spindle, said magazine also being provided with a restock station at which a tool storage position of said magazine may be located to receive tools withdrawn from the spindle;

drive means connected to actuate said storage magazine for locating the tools carried in said magazine successively at the ready station; and.

tool transfer means operable to withdraw a tool located at the ready station and to insert the tool in the spindle and simultaneously withdraw a previously used tool from the spindle and insert it into the magazine in the storage position located at the restock station.

5. In a machine tool;

an upwardly extending column;

a work supporting table movably supported by said column;

a spindle rotatably supported in said column and adapted to receive different tools for operation on a workpiece carried by said table;

a tool storage magazine supported by said column for movement in a plane parallel to the axis about which said spindle rotates, said magazine having a plurality of storage sockets carrying a plurality of tools so that movement of said magazine moves the tools in said sockets successively into a tool ready station and a preceding empty socket into a restock station; and, tool transfer means carried by said column for transferring a tool from the storage socket in the ready station to said spindle and simultaneously transferring the previously used tool from said spindle into the storage socket in the restock station.

6. In a tool change mechanism for changing the tools at the operating station of a machine tool;

a frame;

a tool storage magazine for carrying a plurality of tools to be used at the operating station, said magazine having a ready station from which new tools are withdrawn for placement in the spindle and a restock station into which previously used tools are transferred from the operating station; and, a tool change arm movably supported by said frame for engaging the previously used tool in the operating station and the new tool in the ready station, simultaneously extracting both of the engaged tools from the operating station and from the ready station, shifting the position of the two engaged tools and then simultaneously inserting the new tool into the operating station and the previously used tool into the restock station;

whereby said tool change arm extracts a tool from the magazine at one station and subsequently returns the same tool to the magazine at a different station.

7. A tool change mechanism according to claim 6 wherein said magazine is moved in a forward direction for advancing said sockets sequentially into said ready station and said restock station; and, including means for moving said magazine in a reverse direction to position in said restock station the socket which previously carried the tool being transferred out of the operation station.

8. In a machine tool having a frame;

an operating tool spindle adapted to removably carry a tool;

a movable storage member provided with a plurality of tool receiving storage sockets, said storage member having a tool ready station and a tool restock station;

a plurality of tools removably carried in said storage sockets in the sequence of their use in the spindle;

a tool transfer member operable to engage and remove a tool from a storage socket located at the ready station and simultaneously engage and remove a previously used tool from said spindle, said tool transfer member being further operable to insert the previously used tool in a storage socket located at the ready station and simultaneously insert the new tool in said spindle;

a source of power connected to move said storage member and said transfer member;

control means connected to regulate the operation of said source of power to effect a desired movement of said storage member and said transfer member;

a first means connected to initiate the operation of said control means to regulate said source of power for moving said storage member in a first direction to move a storage socket with a tool therein into said ready station;

a memory circuit connected to count the sockets moving into said ready station when said storage member is moved in the first direction to locate a new tool in the ready station;

a tool sensing means operable in response to a tool in the ready station to operate said control means to stop the movement of said storage member, a second means for operating said control means for regulating said source of power to operate said tool transfer member to remove a tool from the storage socket located in the ready station and simultaneously remove the previously used tool from the spindle and to insert the previously used tool in its original storage socket located at the restock station and simultaneously therewith to insert the new tool in said spindle;

third means operable in response to the movement of said transfer member to operate said control means to regulate said source of power for moving said storage member in a second direction to locate the original storage socket in which the previously used tool was stored in said restock station; and, a counter connected to count the number of sockets moving into said restock station as said storage member is moved in the second direction, said counter and said memory circuit cooperating upon coincidence of count registration to actuate said control means for stopping the movement of said storage member with the original storage socket in the restock station in position to receive the previously used tool from said transfer member.

9. In a machine tool having an operating station arranged to receive different tools;

a frame;

a tool storage magazine movably supported by said frame and having a tool ready station and a tool restock station, said magazine having a plurality of storage positions in which different tools for use in the operating station are removably stored;

power means connected to move said magazine for locating the storage position that contains the next tool to be used in the operating station at the ready station;

a control system operably connected to regulate the movement of said magazine to locate the next tool to be used in the ready station while the machine tool is performing a work operation;

a tool change means operable when actuated to simultaneously remove tools from the storage position of the magazine located at the ready station and a previously used tool from the operating station and change the tools in a manner that the tool from the magazine will be placed in the operating station and the previously used tool from the operating station will be placed in the storage position of the magazine located at the restock station; and, means connected in said control system for initiating the operation of said control system to effect the movement of said magazine for locating the empty storage position in said magazine in which the previously used tool was originally stored at the restock station while the tool change means is operating to simultaneously move the new tool and the previously used tool out of the ready station and the operating station respectively.

10. In a machine tool;

a spindle;

a storage magazine provided with a plurality of tool storage sockets, said magazine having a tool ready station at which a socket with a desired tool for transfer to said spindle is located, said magazine also having a restock position at which an empty socket is located for receiving its associated tool that is in the spindle;

a plurality of tools removably stored in said sockets of said magazine for use in said spindle;

means for moving said storage magazine for locating a storage socket with a desired tool at the ready station;

means connected to control said moving means to stop the movement of said magazine when a storage socket with a tool is located at the ready station;

tool transfer means operable to remove the tool from the storage socket at the ready station and simultaneously remove the previously used tool from said spindle, said transfer means being operable to change the position of said tools to insert the new tool in said spindle and the previously used tool in its associated storage socket located at the restock position; and, control means operable in response to the tool changing operation of said transfer means to initiate said magazine moving means to locate the empty storage socket of said magazine in which the previously used tool was stored at the tool restock position so that the previously used tool removed from the spindle by said transfer member in a tool changing operation will be restocked in its original storage socket.

11. In a machine tool having a tool ready station and a tool restock station;

a frame;

an operating spindle adapted to removably support a tool for performing a work operation, said spindle being mounted on said frame;

a tool storage magazine having a plurality of tool storage sockets, movably supported on said frame for locating said sockets at the ready station and the restock station;

a plurality of tools removably carried in said storage sockets, some of said tools being of a larger diameter than others of said tools, the smaller tools being stored in adjacent storage sockets while the larger diameter tools are stored in sockets which are arranged to have an empty storage socket on each side thereof so that the larger diameter tools will not interfere with the smaller tools;

power means connected to operate said storage means for locating tools sequentially at said tool ready station and for locating a desired empty storage socket at the restock station to receive the tool originally stored therein from the spindle;

control means operably connected to regulate the operation of said power means so that a succeeding tool is located in the ready station while the spindle is performing a work operation with a different tool; and, a tool transfer member mounted on said frame and operable to remove a previously used tool from the spindle and a next succeeding new tool from its associated storage socket located at the ready station and transfer the new tool into said spindle and the previously used tool to the restock station into its associated storage socket.

12. In a tool change mechanism for changing the tools at the operating station of a machine tool;
a tool storage magazine for carrying tools to be used at the operating station;
a plurality of sockets movably supported by said magazine with each socket adapted to carry one of the tools, said sockets being movable into a tool ready station;
an electrical control circuit connected to control the movement of said sockets;
a switch connected in said control circuit; and,
actuating means carried by each of said sockets for actuating said switch and being movable between an inoperative and an operative position, said actuating means being moved to the operative position by the placement of a tool in its associated socket for actuating said switch during the movement of the socket to indicate in the electrical control circuit the presence of a tool in the socket and stop the movement of said sockets to locate the socket with the indicated tool in the ready station.

13. In a tool change mechanism for changing the tools at the operating station of a machine tool;
a tool storage magazine for carrying tools to be used at the operating station;
a plurality of sockets movably supported by said magazine with each socket being adapted to carry one of the tools, said sockets being movable into a tool ready station;
an electrical control circuit connected to control the movement of said sockets;
a switch connected in said control circuit; and,
actuating means carried by each of said sockets for actuating said switch and being movable between an inoperative and an operative position, said actuating means being moved to the operative position by the placement of a tool in its associated socket for actuating said switch during the movement of the socket to indicate in the electrical control circuit the presence of a tool in the socket.

14. In a tool change mechanism for changing the tools at the operating station of a machine tool;
a tool storage magazine having a plurality of storage positions adapted to carry tools for use at the operating station for movement to a ready station;
an electrical control circuit connected to control the movement of said magazine;
tool sensing means connected in said electrical control circuit and operable when actuated to operate said control circuit to stop the movement of said magazine; and,
actuating means carried by each of said tool storage positions and normally disposed in an inoperative position, said actuating means being movable to an operative position by a tool in the associated storage position for actuating said sensing means during the movement of said magazine.

15. In a tool change mechanism for changing tools at the operating station of a machine tool;
a tool storage magazine for carrying tools to be used at the operating station, said magazine being provided with a plurality of storage positions each adapted to carry a tool for movement to a ready station;
an electrical control circuit connected to control the movement of said magazine; and,
tool sensing means connected in said control circuit and operable by a tool in a storage position of said magazine to effect the operation of said control circuit to stop magazine movement.

16. In a tool change mechanism for changing the tools at the operating station of a machine tool;
a frame;
a tool storage magazine carrying a plurality of tools for use at the operating station;
a tool change arm supported by said frame for transferring tools between said magazine and the operating station, said arm being movable between an extended and a retracted position;
a pair of tool gripping elements mounted on said arm for movement relative to each other between an open and a closed position for securing a tool to be transferred to said arm;
a first wedge member carried by said arm and connected to one of said gripping elements;
a second wedge member carried by said arm in position to be moved into forceful engagement with said first wedge member to effect relative movement of said gripping elements to a closed position;
a first spring carried by said arm and operably connected with said second wedge member, said first spring normally operating to urge said second wedge member into forceful engagement with said first wedge member;
a rod carried by said arm and operable in response to the movement of said arm to its retracted position to move said second wedge member to an inoperative position; and,
a second spring carried by said arm in position to effect the relative movement of said gripping elements to their open position when said second wedge member is moved to an inoperative position.

17. In a tool change mechanism for changing the tools at the operating station of a machine tool;
a frame;
a tool storage magazine carrying a plurality of tools for use at the operating station;
a tool change arm supported by said frame for transferring tools between said magazine and the operating station, said arm being movable between an extended and a retracted position;
a pair of tool gripping members mounted on said arm for movement relative to each other between an open and a closed position for securing a tool to be transferred to said arm;
a pair of wedge members carried by said arm for movement relative to each other, said wedge members being operably arranged so that relative movement therebetween in one direction operates to effect the relative movement of said gripping members to a closed position;
yieldable means carried by said arm and operably connected to effect movement of said wedge members relative to each other in the one direction;
a force applying member carried by said arm and operable in response to the movement of said arm to its retracted position to apply a force to said wedge members for effecting relative movement therebetween in a second direction; and,
a second yieldable means carried by said arm in position to move said gripping members relative to each other to their open position upon relative movement of said wedge members in the second direction.

18. In a tool change mechanism for changing the tools at the operating station of a machine tool;
a frame;
a tool storage magazine supported by said frame for carrying a plurality of tools to be used at the operating station;
a tool change arm supported by said frame for transferring tools between said magazine and the operating station, said arm being movable between an extended and a retracted position;
a pair of tool gripping members supported on said arm for simultaneous movement relative to said arm between an extended and a retracted position, said gripping members being also movable relative to each other between an open and a closed position;

a first yieldable means carried by said arm and normally operating to urge said gripping members to an open position;

a second yieldable means carried by said arm and normally operating in response to the movement of said arm to an extended position to overcome said first yieldable means to move said gripping members to their closed position; and, actuating means carried by said arm and operable in response to the movement of said arm to a retracted position to render said second yieldable means inoperative so that said first yieldable means urges said gripping members to their open position.

19. In a tool change mechanism for changing the tools at the operating station of a machine tool;

a frame;

a tool storage magazine for carrying a plurality of tools to be used at the operating station;

a tool change arm supported by said frame for transferring tools between said tool storage magazine and the operating station, said arm being movable between an extended and a retracted position;

a grip mounted on said tool change arm for gripping the tool to be transferred, said grip being actuatable between an open position and a closed position;

actuating means carried by said arm and yieldably urging said grip to its closed position for securing a tool to said arm; and, an abutment on said frame in position to be engaged by said actuating means when said arm is in the retracted position for operating said actuating means against the yieldable force to open said grip for engaging a tool.

20. In a tool change mechanism for changing the tools at the operating station of a machine tool;

a frame;

a tool storage magazine carrying a plurality of tools to be used at the operating station;

a tool change arm supported by said frame for transferring tools between said tool storage magazine and the operating station, said arm being movable between an extended and a retracted position;

a grip mounted on said tool change arm for gripping the tool to be transferred, said grip being actuatable between an open position and a closed position; and, actuating means carried by said arm and responsive to the movement of said arm to its extended and retracted positions for actuating said grip.

References Cited by the Examiner
UNITED STATES PATENTS

| | | | |
|---|---|---|---|
| 3,173,203 | 3/1965 | Anthony | 29—568 |
| 3,218,706 | 11/1965 | Zankl et al. | 29—568 |

RICHARD H. EANES, JR., *Primary Examiner.*